United States Patent
Bales et al.

(10) Patent No.: US 10,502,064 B2
(45) Date of Patent: Dec. 10, 2019

(54) POWER BEAM WELDED CAVITY-BACK TITANIUM HOLLOW FAN BLADE

(71) Applicant: United Technologies Corporation, Farmington, CT (US)

(72) Inventors: Daniel A. Bales, Avon, CT (US); Dmitri Novikov, Avon, CT (US); Robert C. Dolan, Coventry, CT (US); Kenneth A. Frisk, West Hartford, CT (US); Steven T. Gordon, Glastonbury, CT (US); William R. Graves, Amston, CT (US); Eric W. Malmborg, Amston, CT (US); Francis B. Parisi, West Suffield, CT (US); Randy P. Salva, Baltic, CT (US); Michael A. Weisse, Tolland, CT (US); Russell A. Beers, Manchester, CT (US); Xuedong Zhou, Glastonbury, CT (US); Christopher Treese, West Hartford, CT (US); Tri Nguyen, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 193 days.

(21) Appl. No.: 15/670,654

(22) Filed: Aug. 7, 2017

(65) Prior Publication Data
US 2019/0040744 A1    Feb. 7, 2019

(51) Int. Cl.
*F01D 5/00* (2006.01)
*F01D 5/14* (2006.01)
(Continued)

(52) U.S. Cl.
CPC ............ *F01D 5/147* (2013.01); *B23K 1/0018* (2013.01); *B23K 15/0006* (2013.01);
(Continued)

(58) Field of Classification Search
CPC . F04D 5/147; F04D 5/18; F01D 5/147; F01D 5/18; F01D 5/3061
See application file for complete search history.

(56) References Cited

U.S. PATENT DOCUMENTS

| 2,675,208 | A | | 4/1954 | Weinberg |
| 4,802,823 | A | * | 2/1989 | Decko ................ F01D 5/147 |
| | | | | 415/135 |

(Continued)

FOREIGN PATENT DOCUMENTS

| CN | 101418811 A | 4/2009 |
| EP | 2727681 A1 | 5/2014 |

(Continued)

OTHER PUBLICATIONS

Extended European Search Report for European Patent Application No. 18187221.9 dated Mar. 27, 2019 10 pages.

*Primary Examiner* — Thomas N Moulis
(74) *Attorney, Agent, or Firm* — Kinney & Lange, P.A.

(57) ABSTRACT

An airfoil including an airfoil body, a recessed portion of a first depth in a first side of the airfoil body, the recessed portion including a plurality of pockets of a second depth located within the recessed portion and ribs of the first depth located between the pockets, a cover configured to fit into the recessed portion such that an interior surface of the cover engages the ribs and an exterior surface of the cover is about flush with an exterior surface of the first side of the airfoil body, and a high energy beam weld configuration extending through the cover and into the ribs and positioned to attach the cover to the ribs.

21 Claims, 22 Drawing Sheets

(51) Int. Cl.
*F04D 29/26* (2006.01)
*B23P 15/04* (2006.01)
*B23K 15/00* (2006.01)
*B23K 26/28* (2014.01)
*F01D 5/30* (2006.01)
*F01D 5/18* (2006.01)
*B23K 1/00* (2006.01)
*B23K 26/244* (2014.01)
*F04D 29/02* (2006.01)
*F04D 29/32* (2006.01)
*F01D 9/04* (2006.01)
*B23K 101/00* (2006.01)

(52) U.S. Cl.
CPC ........ *B23K 15/0053* (2013.01); *B23K 26/244* (2015.10); *B23K 26/28* (2013.01); *B23P 15/04* (2013.01); *F01D 5/18* (2013.01); *F01D 5/3061* (2013.01); *F04D 29/023* (2013.01); *F04D 29/26* (2013.01); *F04D 29/324* (2013.01); *B23K 2101/001* (2018.08); *F01D 9/044* (2013.01); *F05D 2220/323* (2013.01); *F05D 2220/36* (2013.01); *F05D 2230/10* (2013.01); *F05D 2230/233* (2013.01); *F05D 2230/234* (2013.01); *F05D 2240/30* (2013.01); *F05D 2250/185* (2013.01); *F05D 2300/133* (2013.01)

(56) References Cited

U.S. PATENT DOCUMENTS

| | | | |
|---|---|---|---|
| 6,039,542 A | 3/2000 | Schilling et al. | |
| 7,021,899 B2 * | 4/2006 | Ferte | B23K 20/122 29/889.72 |
| 7,189,064 B2 * | 3/2007 | Helder | B23K 20/122 416/232 |
| 7,753,654 B2 | 7/2010 | Read et al. | |
| 7,828,526 B2 * | 11/2010 | Cairo | F01D 5/147 416/224 |
| 9,221,120 B2 * | 12/2015 | Schwarz | F01D 5/147 |
| 9,453,418 B2 * | 9/2016 | Hui | F01D 5/147 |
| 9,587,497 B2 * | 3/2017 | Hunziker | F01D 5/282 |
| 9,855,628 B2 * | 1/2018 | Radomski | B23P 15/04 |
| 10,132,177 B2 * | 11/2018 | Fribourg | B23P 11/025 |
| 10,215,027 B2 * | 2/2019 | Schwarz | F01D 5/16 |
| 10,260,350 B2 * | 4/2019 | Anderson | F01D 5/141 |
| 10,294,958 B2 * | 5/2019 | Hui | F04D 29/023 |
| 2001/0007634 A1 * | 7/2001 | Beyer | F03B 3/02 416/232 |
| 2005/0044708 A1 | 3/2005 | Lundgren et al. | |
| 2007/0014670 A1 * | 1/2007 | Maeno | B23P 15/04 416/232 |
| 2007/0065291 A1 * | 3/2007 | Karafillis | F01D 5/16 416/224 |
| 2011/0211965 A1 * | 9/2011 | Deal | F01D 5/147 416/223 R |
| 2013/0039774 A1 | 2/2013 | Viens et al. | |
| 2014/0241897 A1 | 8/2014 | Bales et al. | |
| 2014/0286785 A1 * | 9/2014 | Ganesh | B23P 15/02 416/233 |
| 2015/0125308 A1 | 5/2015 | Radomski | |
| 2015/0226068 A1 | 8/2015 | Maurizio | |
| 2016/0265365 A1 | 9/2016 | Crowston | |
| 2019/0032674 A1 * | 1/2019 | Bales | F04D 29/388 |
| 2019/0218915 A1 * | 7/2019 | Bales | F01D 5/181 |

FOREIGN PATENT DOCUMENTS

| | | |
|---|---|---|
| EP | 3153664 A1 | 4/2017 |
| JP | S6326285 A | 2/1988 |
| JP | H05372 A | 1/1993 |
| JP | 2004036485 A | 2/2004 |
| KR | 20110080889 A | 7/2011 |
| KR | 101383782 B1 | 4/2014 |

* cited by examiner

US 10,502,064 B2

POWER BEAM WELDED CAVITY-BACK TITANIUM HOLLOW FAN BLADE

BACKGROUND

Fan blades are used to direct air into a gas turbine engine. Typically, fan blades are made of metal, such as titanium, and have an airfoil shape that includes a twist from the root of the blade to the tip of the blade. However, the fan blade is often not solid metal due to weight constraints. Rather, a hollow fan blade is used to achieve lighter weight. The process for producing a hollow titanium fan blade can be time-consuming, complex, and expensive, often requiring a costly protective environment and equipment.

SUMMARY

An airfoil including an airfoil body, a recessed portion of a first depth in a first side of the airfoil body, the recessed portion including a plurality of pockets of a second depth located within the recessed portion and ribs of the first depth located between the pockets, a cover configured to fit into the recessed portion such that an interior surface of the cover engages the ribs and an exterior surface of the cover is about flush with an exterior surface of the first side of the airfoil body, and a high energy beam weld configuration extending through the cover and into the ribs and positioned to attach the cover to the ribs.

A method of manufacturing an airfoil including machining a recessed portion of a first depth into a first side of a titanium airfoil body, milling pockets of a second depth into the recessed portion in the first side of the titanium forging of the airfoil body, placing a cover into the recessed portion of the airfoil body such that the exterior surface of the cover is about flush with a first surface of the first side of the airfoil body, and high energy beam welding through the cover and into ribs between the pockets in the airfoil body such that the cover attaches and seals to the airfoil body.

DETAILED DESCRIPTION

Power beam welding or high energy beam welding (such as laser welding, possibly via a fiber optic laser, or electron beam welding) through a cover and onto ribs of a twisted cavity-back fan blade attaches the cover to the ribs of the fan blade. Such welding is quicker, and minimizes the depth and width of the weld as well as the heat input, which reduces residual stress and blade distortion, increasing the structural integrity and fatigue life of the blade. As a result, production capability and consistency are increased and expense and environmental constraints are reduced. Additionally, adding a braze material palette adjacent the weld or adding a groove in the rib reduces built-in cracks, or infinitely high stress concentrations, and thus yields lower stress concentrations.

Figure 1:
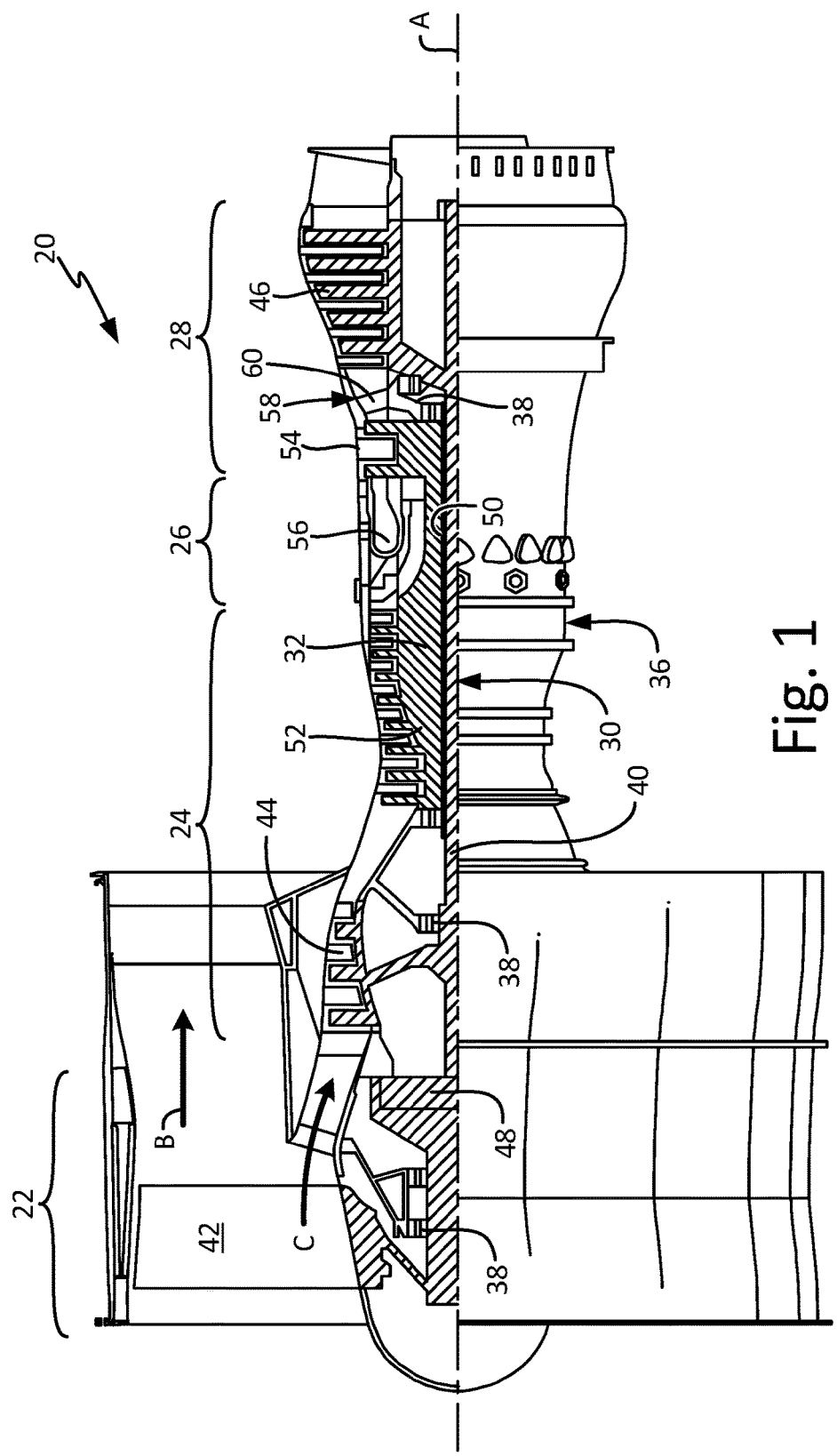
FIG. 1 is a partial cross-sectional view of an example gas turbine engine.

FIG. 1 is a quarter-sectional view that schematically illustrates example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis A.

Combustor 56 is arranged between high pressure compressor 52 and high pressure turbine 54. In one example, high pressure turbine 54 includes at least two stages to provide double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 can be arranged generally between high pressure turbine 54 and low pressure turbine 46. Mid-turbine frame 58 further supports bearing systems 38 in turbine section 28 as well as setting airflow entering the low pressure turbine 46.

The gas flow in core flow path C is compressed first by low pressure compressor 44 and then by high pressure compressor 52, mixed with fuel and ignited in combustor 56 to produce high speed exhaust gases, and then expanded through high pressure turbine 54 and low pressure turbine 46. Mid-turbine frame 58 includes vanes 60, which are in the core flow path and function as an inlet guide vane for low pressure turbine 46. Utilizing vane 60 of mid-turbine frame 58 as the inlet guide vane for low pressure turbine 46 decreases the axial length of the low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

Figure 2A:
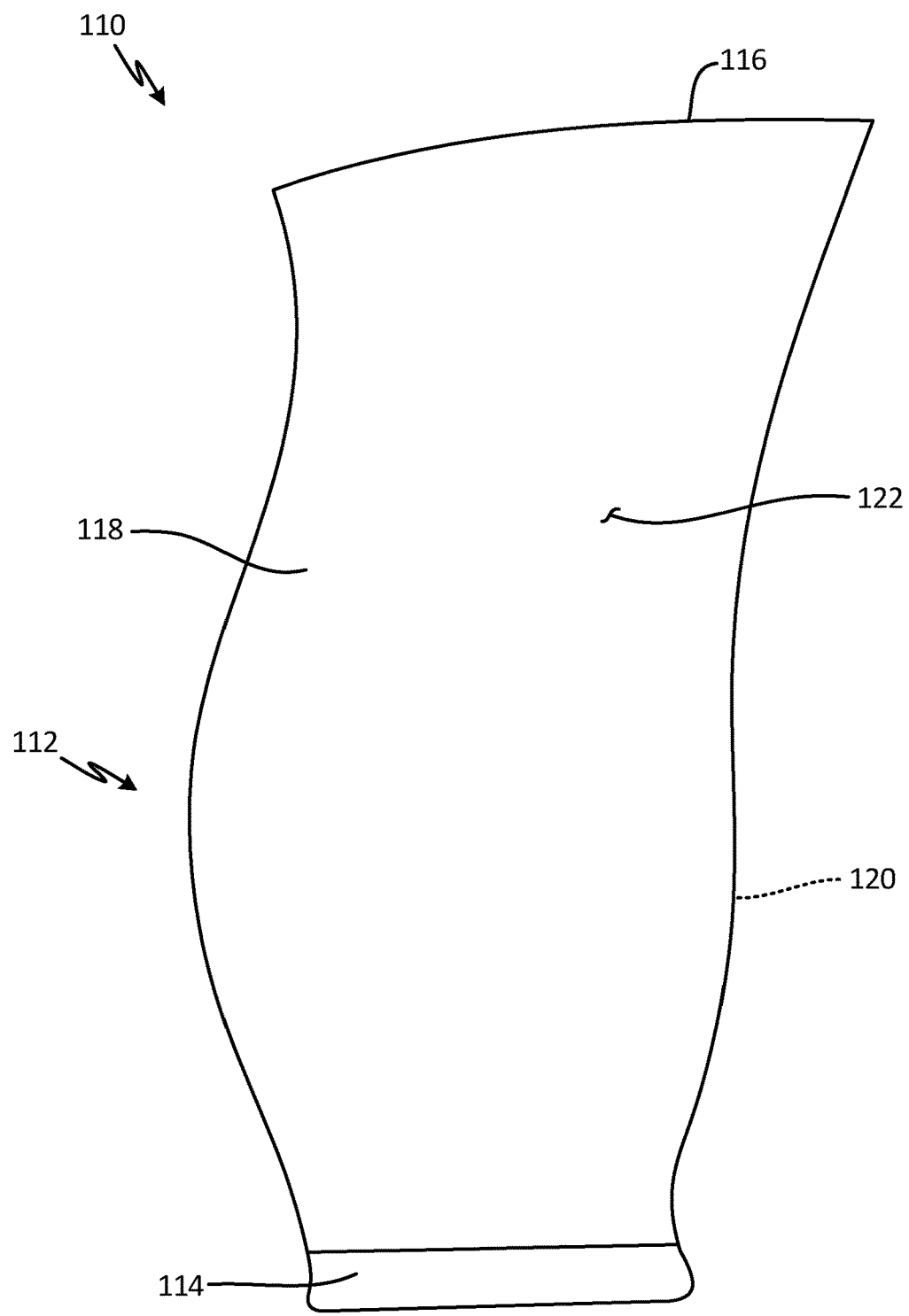
FIG. 2A is a view of a fan blade having a forging as an airfoil body.
Figure 2B:
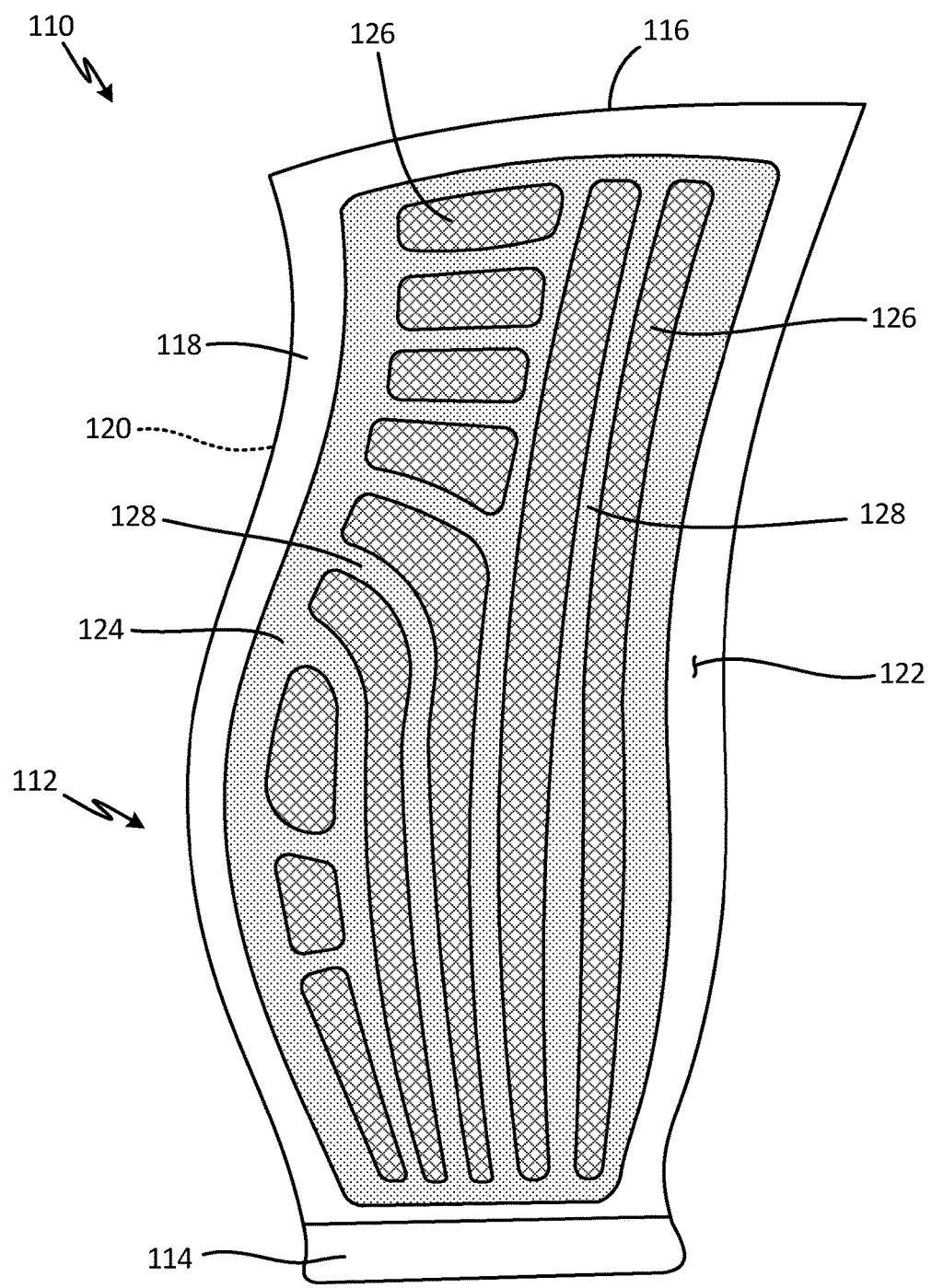
FIG. 2B is a view of the fan blade with a recessed portion and pockets in the airfoil body.
Figure 2C:
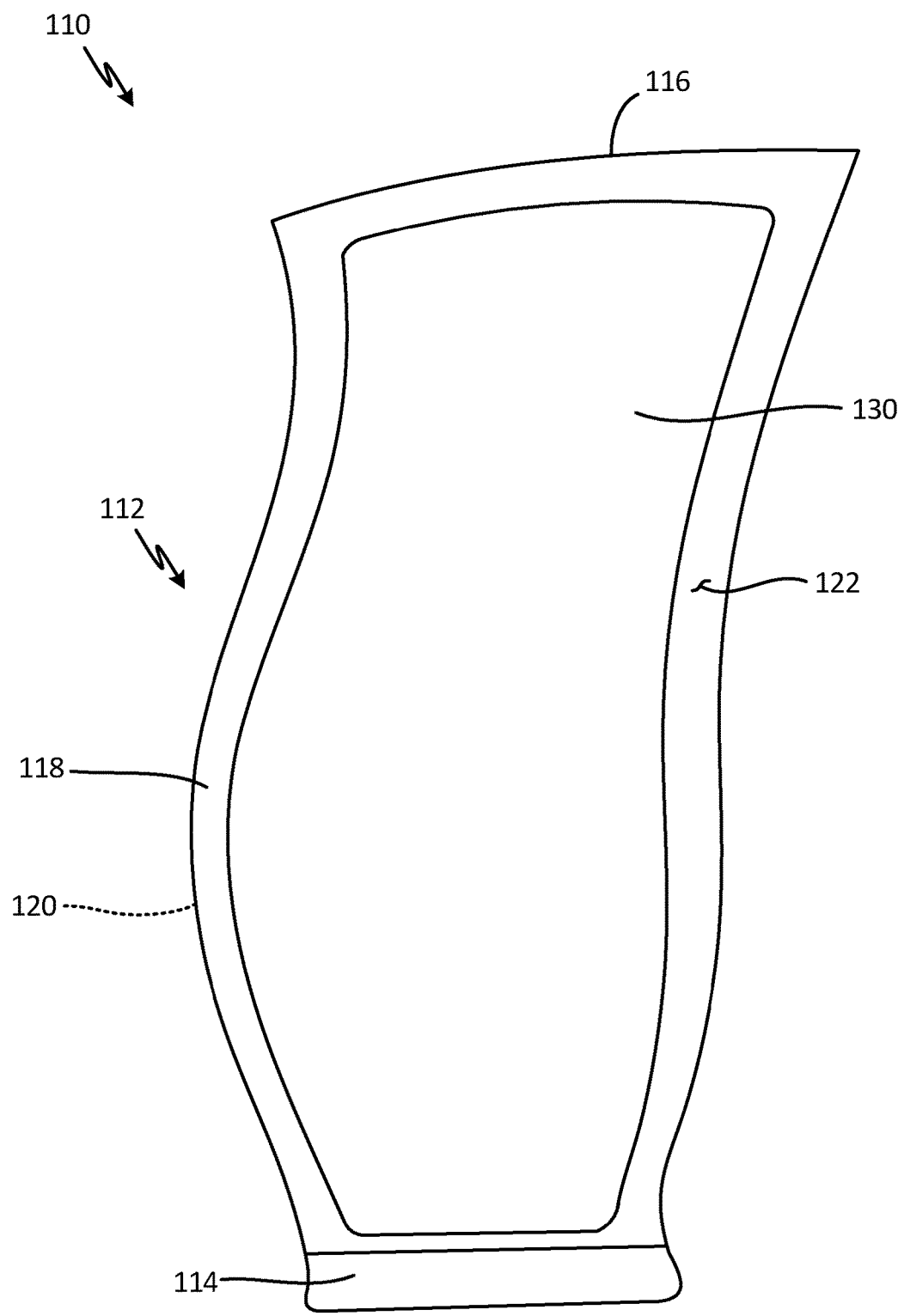
FIG. 2C is a view of the fan blade with a cover attached.

FIG. 2A is a view of fan blade 110 having a forging as airfoil body 112. FIG. 2B is a view of fan blade 110 with recessed portion 124 and pockets 126 in airfoil body 112. FIG. 2C is a view of fan blade 110 with cover 130 attached. FIGS. 2A, 2B, and 2C will be discussed together. Fan blade 110 includes airfoil body 112, root 114, tip 116, first side 118, second side 120, exterior surface 122, recessed portion 124 (shown in FIG. 2B), pockets 126 (shown in FIG. 2B), ribs 128 (shown in FIG. 2B), and cover 130 (shown in FIG. 2C).

Fan blade 110 has airfoil body 112 forming the main body of fan blade 110. Root 114 is at a first end of airfoil body 112 and tip 116 is at a second end of airfoil body 112. Airfoil body 112 has a twisted airfoil shape. Airfoil body 112 may twist about 60 degrees from root 114 to tip 116. The thickness of airfoil body 112 varies, the thickest portion being at root 114. First side 118 is at a first side of airfoil body 112 and extends from root 114 to tip 116, and second side 120 is at a second side of airfoil body 112 and extends from root 114 to tip 116. Exterior surface 122 is the outer surface of first side 118 of airfoil body 112. Recessed portion 124 is a recess in first side 118 of airfoil body 112. Recessed portion 124 has a first depth. Exterior surface 122 extends around recessed portion 124 such that exterior surface 122 makes up a perimeter or periphery of first side 118. Pockets 126 are cavities in recessed portion 124 of airfoil body 112. As such, pockets 126 extend into first side 118 of airfoil body 112. Pockets 126 do not extend through second side 120 of airfoil body 112. Pockets 126 have a second depth, the second depth being deeper than the first depth of recessed portion 124. The second depth may vary along airfoil body 112 as the depth of pockets 126 varies depending on the thickness of airfoil body 112. Airfoil body 112 has a plurality of pockets 126. In this embodiment, 3 pockets 126 are near tip 116 and additional pockets 126 are near root 114. In alternate embodiments, airfoil body 112 has any number of pockets 126 near tip 116 and root 114. Ribs 128 are adjacent the plurality of pockets 126 such that ribs 128 are between pockets 126. Ribs may be straight, curved, or any other suitable shape. Ribs 128 are of the first depth. Cover 130 is attached to first side 118 of airfoil body 112. Cover 130 is very thin. Cover 130 fits into recessed portion 124 such that cover 130 is completely surrounded by recessed portion 124 and an exterior surface of cover 130 is approximately or about flush with exterior surface 122. No pockets 126 are exposed when cover 130 is attached to airfoil body 112. In alternate embodiments, recessed portion 124 and cover 130 may extend to tip 116 such that exterior surface 122 does not extend around the entire perimeter of first side 118.

Fan blade 110 begins with airfoil body 112 as a near net shape forging of a solid titanium alloy, as illustrated in FIG. 2A. The forging of airfoil body 112 has a 60 degree twist from root 114 to tip 116. The forging of airfoil body 112 is near net shape or shaped with a small amount of extra material to an approximate curvature of the finished fan blade 110 in both chordwise and spanwise directions. Recessed portion 124 is machined into first side 118 of the forging of airfoil body 112, as shown in FIG. 2B. Recessed portion 124 is only slightly recessed. Also as shown in FIG. 2B, pockets 126 are milled into recessed portion 124 on first side 118 of airfoil body 112 such that fan blade 110 becomes a cavity-back fan blade. The depth to which pockets 126 are milled depends on the thickness of airfoil body 112. Ribs 128 are the sections of recessed portion 124 of airfoil body 112 that do not get milled out. Cover 130 is superplastic formed from a flat piece of titanium sheet metal to have a 60 degree twist and fit into recessed portion 124. Cover 130 is placed or dropped into recessed portion 124 such that an exterior surface of cover 130 is approximately or about flush with exterior surface 122 of first side 118 of fan blade 110, as illustrated in FIG. 2C. Cover 130 is attached to airfoil body 112 by laser or electron beam welding through cover 130 and into ribs 128 and laser or electron beam welding around the periphery of cover 130 and into airfoil body 112 adjacent the periphery of cover 130. As such, welding involves only two monolithic members, airfoil body 112 and cover 130.

In an alternate embodiment, fan blade 110 may be produced with airfoil body 112 as rolled titanium having less or no initial twist. Airfoil body 112 is then creep formed or superplastic formed to the final airfoil shape during subsequent thermal mechanical processing.

Milling pockets 126 into airfoil body 112 allows for removal of a significant amount of metal and therefore decreases the weight of fan blade 110. Laser or electron beam welding attaches and seals cover 130 to airfoil body 112. As a result, contamination, such as water, does not leak into pockets 126 of fan blade 110. Additionally, the method of manufacturing fan blade 110 requires less thermal operations.

Figure 3A:
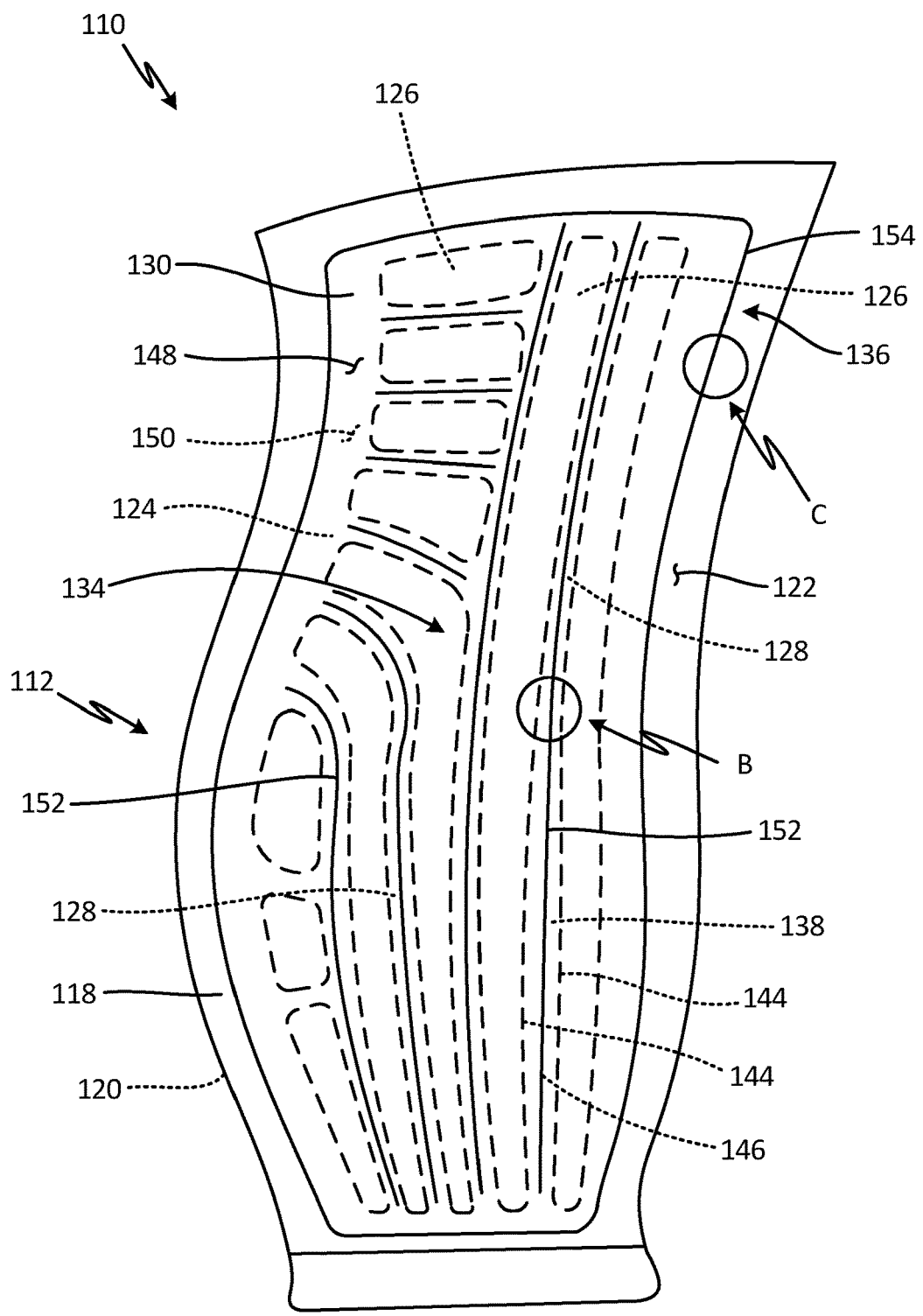
FIG. 3A is a view of the fan blade illustrating laser or electron beam weld configurations.
Figure 3B:
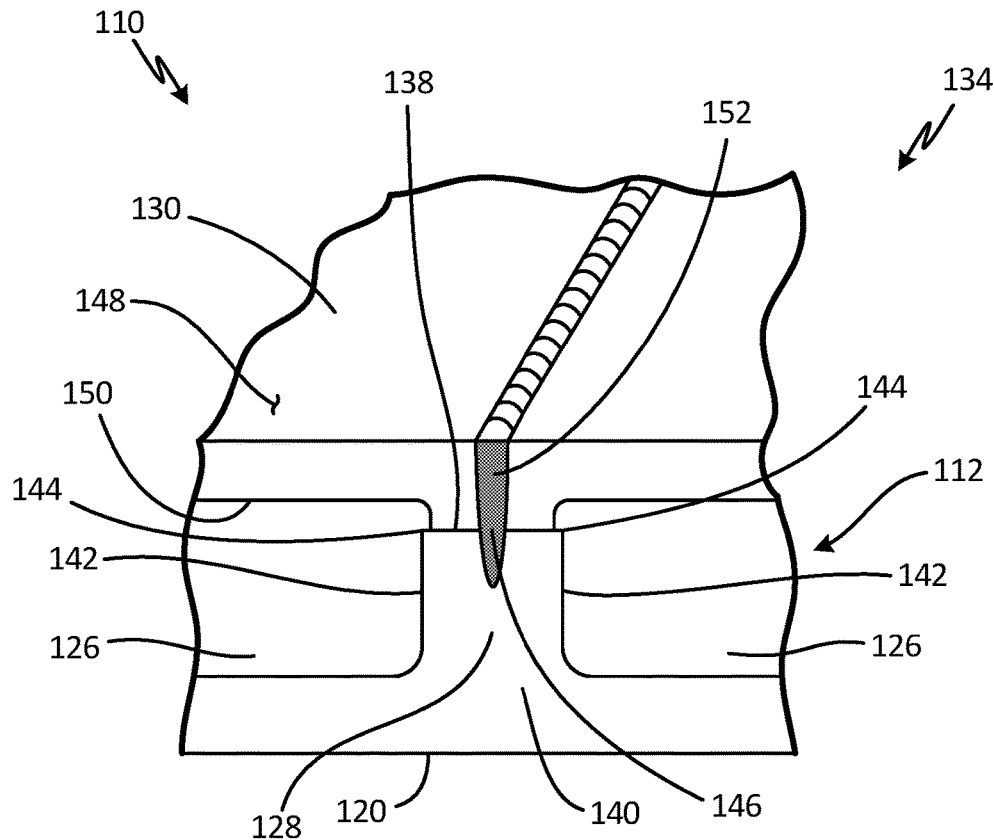
FIG. 3B is an isometric partial cross-sectional view of section B of the fan blade shown in FIG. 3A illustrating the laser or electron beam weld configuration between a rib and the cover as including a single weld down the center of the ribs.
Figure 3C:
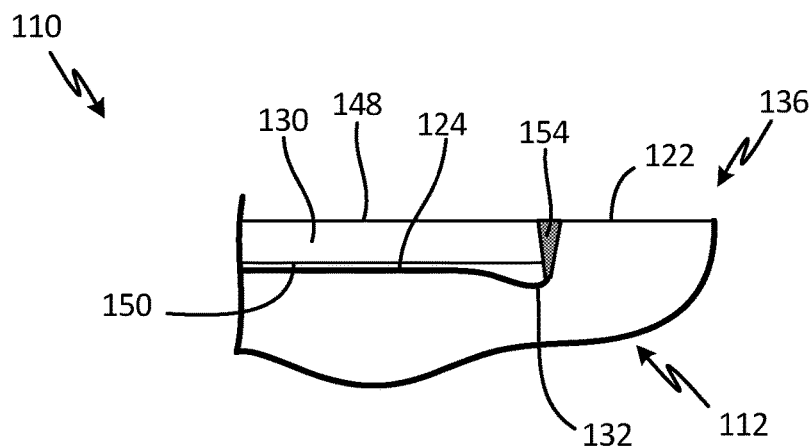
FIG. 3C is a partial cross-sectional view of section C of the fan blade shown in FIG. 3A illustrating the laser or electron beam weld configuration between the cover and the airfoil body.
Figure 3D:
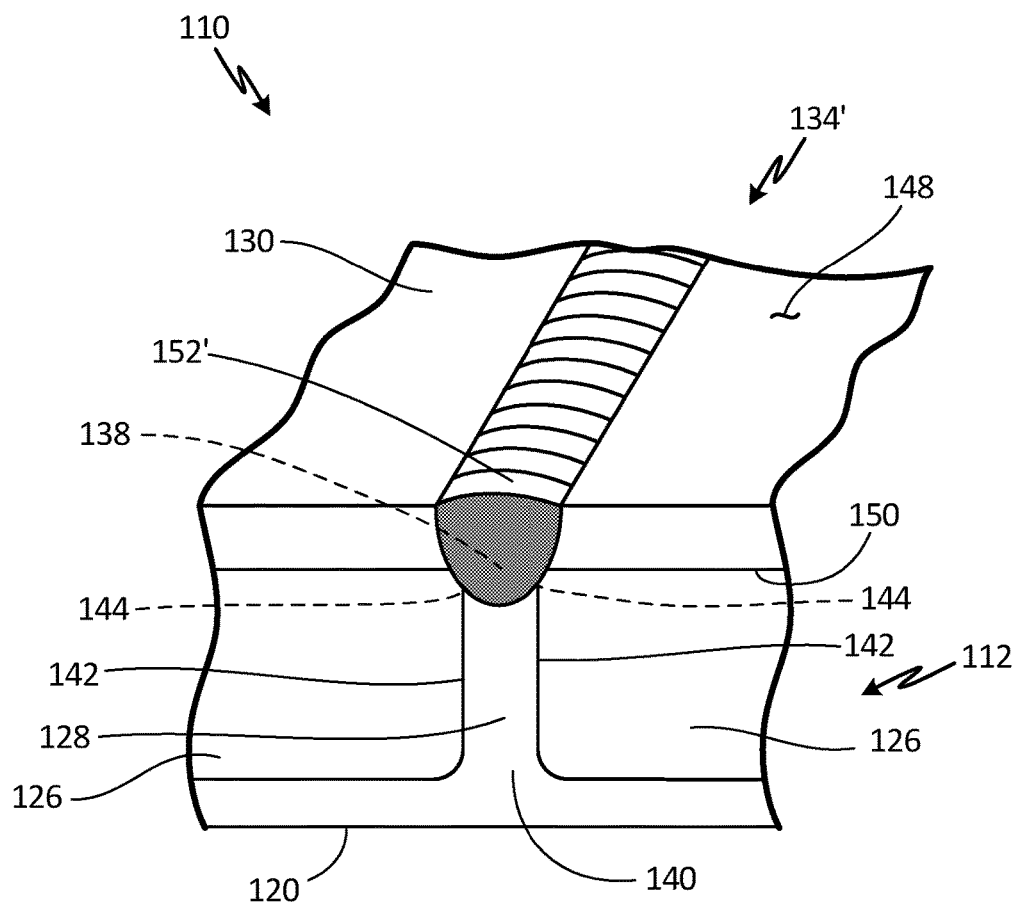
FIG. 3D is an isometric partial cross-sectional view of the fan blade illustrating the laser or electron beam weld configuration between the rib and the cover as including a single weld that completely fuses tops of the ribs.
Figure 3E:
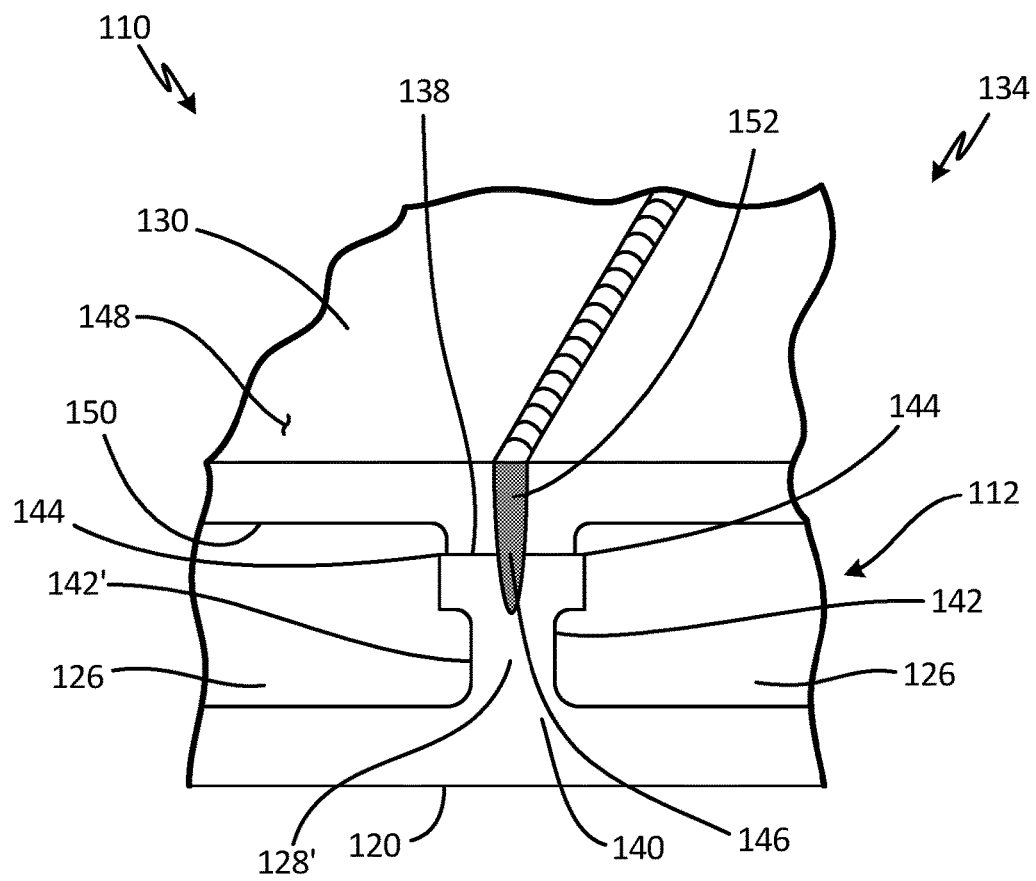
FIG. 3E is an isometric partial cross-sectional view of the fan blade illustrating undercut ribs.
Figure 3F:
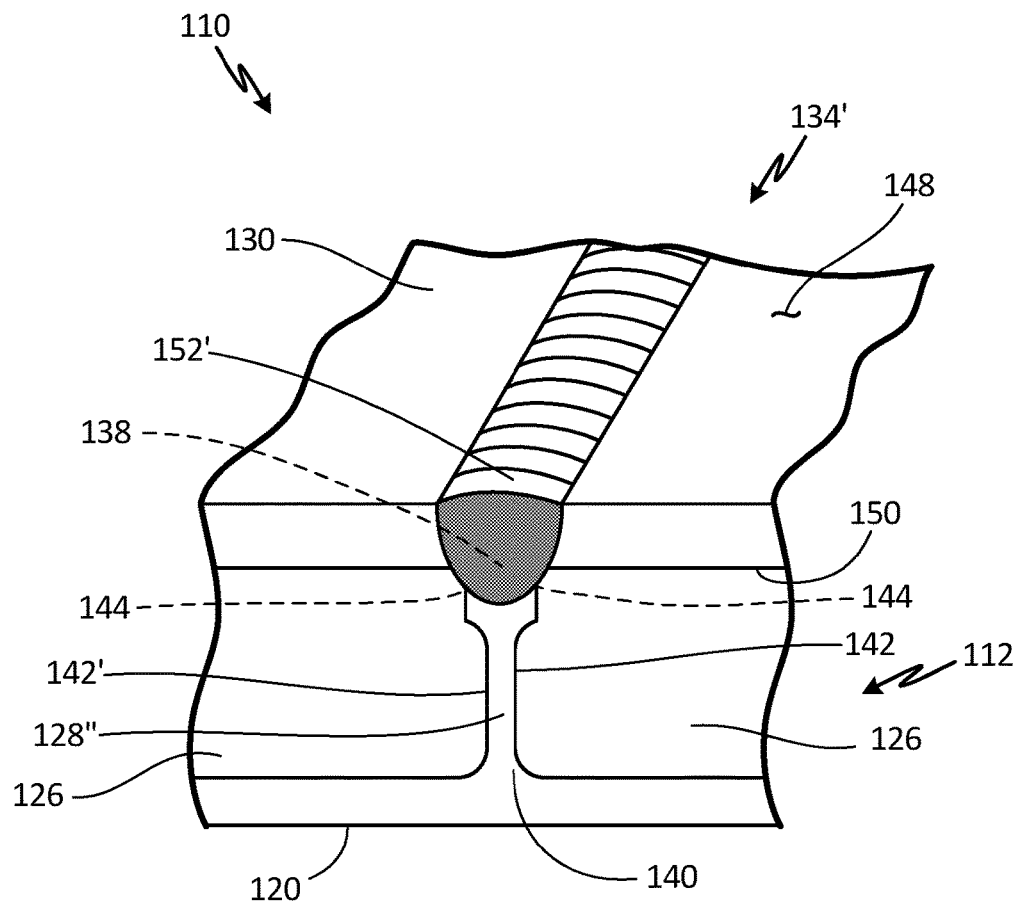
FIG. 3F is an isometric partial cross-sectional view of the fan blade illustrating a second embodiment of undercut ribs.

FIG. 3A is a view of fan blade 110 illustrating laser or electron beam weld configurations 134 and 136. FIG. 3B is an isometric partial cross-sectional view of section B of fan blade 110 shown in FIG. 3A illustrating laser or electron beam weld configuration 134 between rib 128 and cover 130 as including a single weld 152 down the center 146 of ribs 128. FIG. 3C is a partial cross-sectional view of section C of fan blade 110 shown in FIG. 3A illustrating laser or electron beam weld configuration 136 between cover 130 and airfoil body 112. FIG. 3D is an isometric partial cross-sectional view of fan blade 110 illustrating laser or electron beam weld configuration 134' between rib 128 and cover 130 as including a single weld 152' that completely fuses tops 138 of ribs 128. FIG. 3E is an isometric partial cross-sectional view of fan blade 110 illustrating undercut ribs 128'. FIG. 3F is an isometric partial cross-sectional view of fan blade 110 illustrating a second embodiment of undercut ribs 128". FIGS. 3A, 3B, 3C, 3D, 3E, and 3F will be discussed together. Pockets 126 and ribs 128 are shown in phantom in FIG. 3A as they are below cover 130. Fan blade 110 includes airfoil body 112, second side 120 (shown in FIGS. 3A, 3B, 3D, 3E, and 3F), exterior surface 122 (shown in FIGS. 3A and 3C), recessed portion 124 (shown in FIGS. 3A and 3C), pockets 126 (shown in FIGS. 3A, 3B, 3D, 3E, and 3F), ribs 128 (shown in FIGS. 3A, 3B, and 3D), ribs 128' (shown in FIG. 3E), ribs 128" (shown in FIG. 3F), cover 130, cavity 132 (shown in FIG. 3C), laser or electron beam weld configuration 134 (shown in FIGS. 3A, 3B, and 3E), laser or electron beam weld configuration 136 (shown in FIGS. 3A and 3C), and laser or electron beam weld configuration 134' (shown in FIGS. 3D and 3F). Each of ribs 128 has top 138, bottom 140, sides 142, edges 144, and center 146. Cover 130 has exterior side 148 and interior side 150. Laser or electron beam weld configuration 134 includes welds 152. Laser or electron beam weld configuration 136 includes welds 154.

Fan blade 110 has the same structure as described in reference to FIGS. 2A, 2B, and 2C. Cavity 132 is a curved groove in recessed portion 124 that extends around a periphery of recessed portion 124. Cavity 132 is adjacent exterior surface 122 of airfoil body 112. Cavity 132 is machined into recessed portion 124.

Each of ribs 128 has top 138 adjacent cover 130 and bottom 140 adjacent second side 120 of airfoil body 112. Sides 142 of rib 128 extend between top 138 and bottom 140 of rib 128. An edge 144 is at each side of top 138 of rib 128. More specifically, edges 144 are the sections at which sides 142 and top 138 come together. Center 146 is the middle portion of top 138. Center 146 is equidistant from each of edges 144. Ribs 128 may be milled chemically or mechanically to yield undercut ribs 128' or undercut ribs 128", as seen in FIGS. 3E and 3F. Undercut ribs 128' and 128" have sides 142' with annular portions milled out such that ribs 128' and 128" are narrower below tops 138 of undercut ribs 128' and 128". Undercut ribs 128" are similar to undercut ribs 128' but undercut ribs 128" are narrower. Undercut ribs 128' and 128" have similar stiffness as ribs 128 that are not undercut.

Exterior side 148 is a first side of cover 130. Interior side 150 is a second side of cover 130. Portions of interior side 150 of cover 130 contact ribs 128. Interior side 150 of cover 130 may be chemically milled such that cover 130 is thicker at portions that contact ribs 128 and thinner at portions that do not contact ribs 128. As such, thicker portions of cover 130 are raised or have a height above portions of cover 130 that do not contact ribs 128. If cover 130 is chemically milled, thicker portions of cover 130 have a height smaller than the height of ribs 128. Additionally, thicker portions of cover 130 are narrower than ribs 128. Laser or electron beam weld configurations 134 and 134' are positioned in ribs 128 and cover 130. Laser or electron beam weld configuration 136 is positioned around a periphery of cover 130 and airfoil body 112. Laser or electron beam weld configuration 134 includes welds 152. Each of welds 152 extends through cover 130 and into rib 128 down center 146 of rib 128. Weld 152 may extend down center 146 of an entire top 138 of rib 128 or down center 146 of a portion of top 138 of rib 128. Welds 152 are positioned to be 90 degrees from top 138 of rib 128. Welds 152 may be high energy beam welded to cover 130 and ribs 128 using a vision system that captures a picture of ribs 128 with cover 130 removed and uses the picture to translate the location of ribs 128 into a digital file that can be used to ensure welds 152 are placed in the right location when cover 130 is in place. In the case of electron beam welding, real-time x-rays may be used to place welds 152 in ribs 128 through cover 130. Laser or electron beam weld configuration 136 includes welds 154. Each of welds 154 extends into cover 130 and a portion of airfoil body 112 adjacent cover 130. Weld 154 also extends into cavity 132 in recessed portion 124. Laser or electron beam weld configuration 134' includes welds 152'. Each of welds 152' extends through cover 130 and into rib 128. Weld 152' extends into top 138 of rib 128 from a first edge 144 to a second edge 144 such that weld 152' completely fuses top 138 of rib 128. Welds 152' may extend down the entire top 138 of rib 128 or down a portion of top 138 of rib 128. Welds 152' are positioned to be 90 degrees from top 138 of rib 128.

Laser or electron beam weld configurations 134 and 134' attach ribs 128 and cover 130 together such that cover 130 is attached to airfoil body 112. Laser or electron beam weld configuration 134' provides secure attachment of cover 130 to ribs 128 that are narrower. Laser or electron beam weld configuration 136 attaches a perimeter of cover 130 to airfoil body 112. Laser or electron beam weld configuration 136 also seals cover 130 to airfoil body 112. Cavity 132 may trap spatter as weld 154 is placed. Due to cavity 132, weld 154 is a true butt weld. Tops 138 of undercut ribs 128' and 128" provide stability to undercut ribs 128' and 128". Undercut ribs 128' allow for the removal of more metal from fan blade 110, reducing the weight of fan blade 110 without sacrificing the structural integrity of fan blade 110.

High energy beam welding, in this case laser or electron beam weld configurations 134, 134', and 136, is a simple, quick, and low cost method of attaching cover 130 to ribs 128. Additionally, high energy beam welding reduces the heat input, which reduces residual stress and blade distortion, increasing the structural integrity and fatigue life of the blade. Further, high energy beam welding can be carried out in an argon cover gas environment or a vacuum. Laser or electron beam weld configurations 134, 134', and 136 also produce fan blade 110 with enough strength to withstand bird strikes. Laser or electron beam weld configuration 134' provides full-penetration welds for cover attachment without introducing built-in cracks, therefore reducing stress concentrations. Moreover, cavity 132 significantly reduces stress concentrations.

Figure 4A:
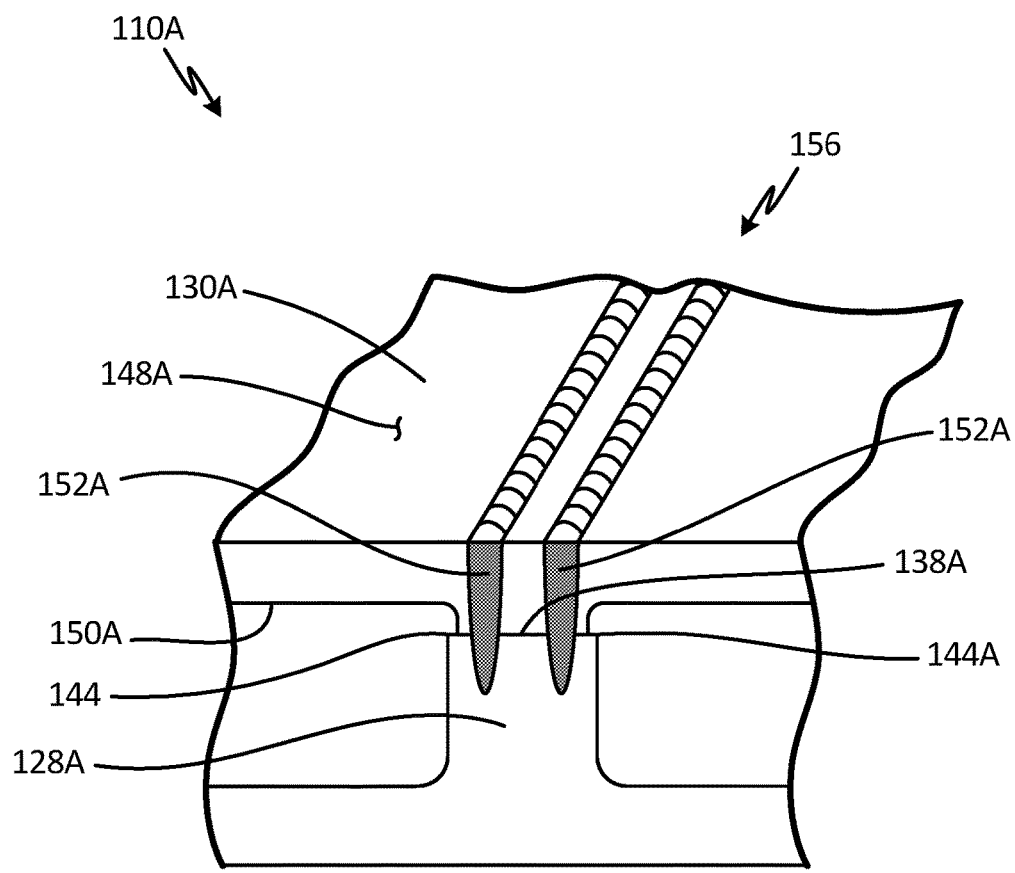
FIG. 4A is an isometric partial cross-sectional view of an embodiment of the fan blade having a laser or electron beam weld configuration including two welds spaced between edges of the rib.
Figure 4B:
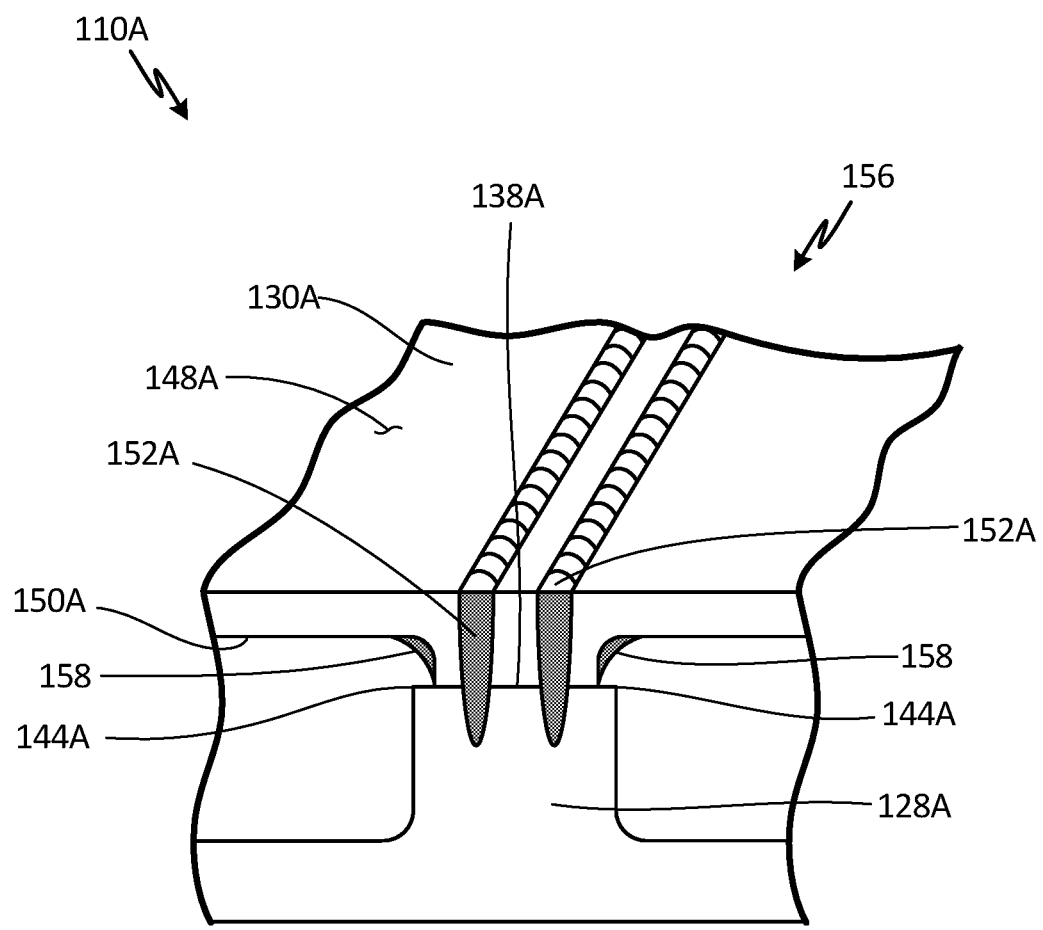
FIG. 4B is an isometric partial cross-sectional view of an embodiment of the fan blade having a brazing material deposited on the cover adjacent a laser or electron beam weld configuration.

FIG. 4A is an isometric partial cross-sectional view of an embodiment of fan blade 110A having laser or electron beam weld configuration 156 including two welds 152A spaced between edges 144A of rib 128A. FIG. 4B is an isometric partial cross-sectional view of an embodiment of fan blade 110A having brazing material 158 deposited on cover 130A adjacent laser or electron beam weld configuration 156. FIGS. 4A and 4B will be discussed together. Fan blade 110A includes ribs 128A, cover 130A, laser or electron beam weld configuration 156, and brazing material 158. Each of ribs 128A has top 138A and edges 144A. Cover 130A has exterior side 148A and interior side 150A. Laser or electron beam weld configuration 156 includes two welds 152A.

Fan blade 110A has the same structure as described in reference to fan blade 110 in FIGS. 2A, 2B, 2C, 3A and 3B with a different laser or electron beam weld configuration. Laser or electron beam weld configuration 156 is positioned in ribs 128A and cover 130A. Laser or electron beam weld configuration 156 includes two welds 152A. Each of welds 152A extends through cover 130 and into rib 128. Two welds 152A are spaced along top 138A and between edges 144A of rib 128A. Welds 152A may extend down an entire top 138A of rib 128A or a portion of top 138A of rib 128A. Welds 152A are positioned to be 90 degrees from top 138A of rib 128A. Brazing material 158, as shown in FIG. 4B, may be deposited on interior side 150A of cover 130A adjacent ribs 128A. Brazing material 158 may be deposited in a pattern that matches a location of ribs 128A. Brazing material 158 may be a braze alloy such as a titanium alloy with copper and nickel or any other suitable brazing material. Brazing material 158 may be deposited by cathodic arc deposition, cold spray deposition, or any other suitable method of deposition. Brazing material 58 may be deposited only on portions of one or more ribs 128A.

Laser or electron beam weld configuration 156 utilizes two welds 152A between edges 144A to attach ribs 128A and cover 130A. Brazing material 158 is located away from welds 152A and melts as laser or electron beam welding occurs and forms small fillets adjacent welds 152A.

Laser or electron beam weld configuration 156 provides secure attachment of cover 130A to ribs 128A that are wider. Brazing material 158 prevents built-in cracks from forming, reducing the stress concentrations and increasing the life of fan blade 110A.

Figure 5A:
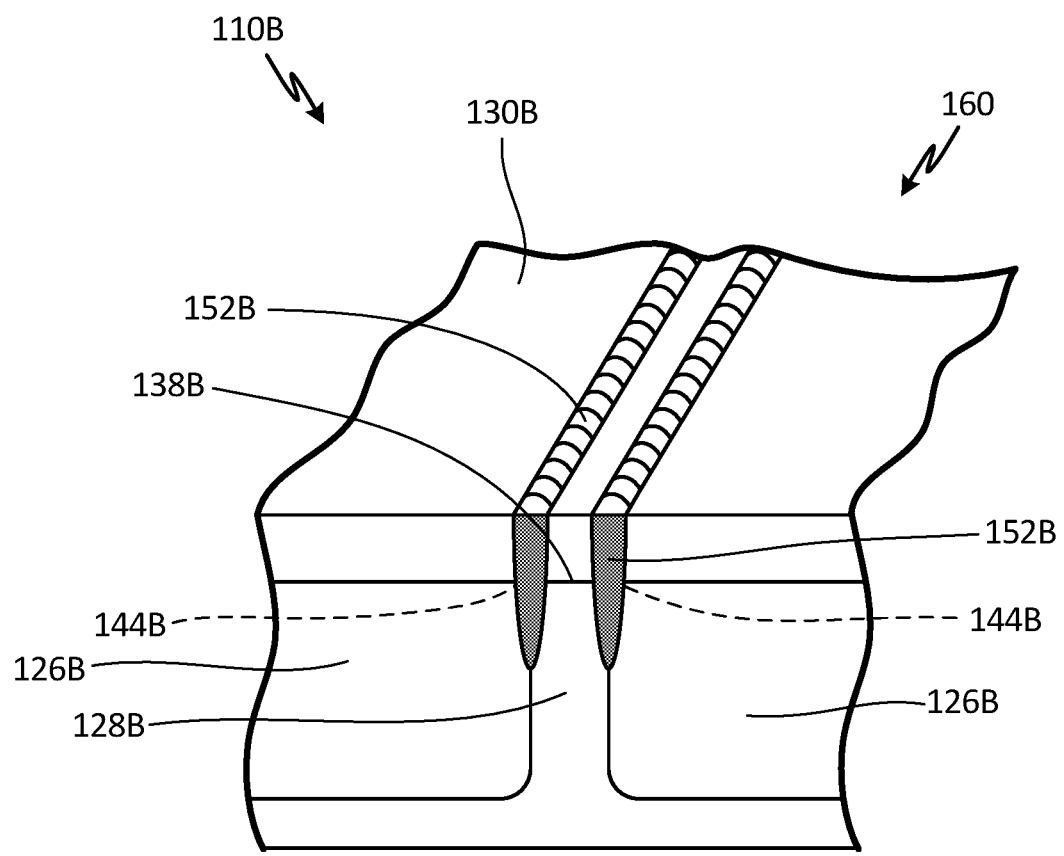
FIG. 5A is an isometric partial cross-sectional view of an embodiment of the fan blade having a laser or electron beam weld configuration including two welds positioned at edges of the rib.
Figure 5B:
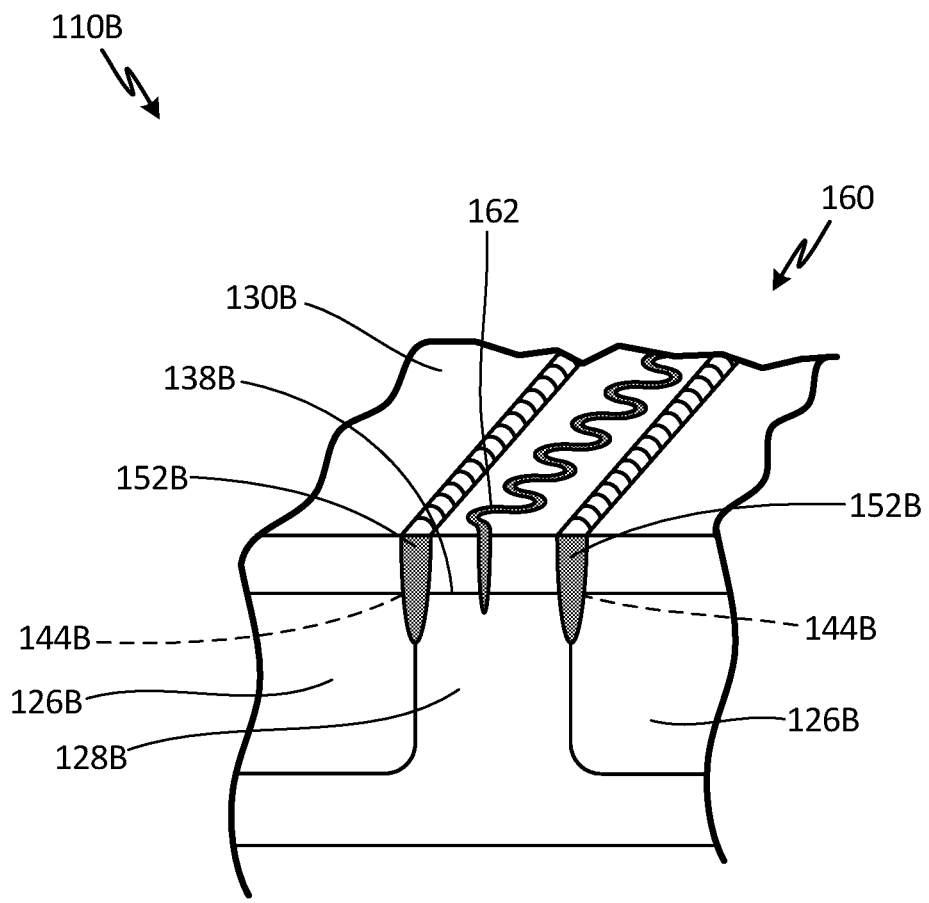
FIG. 5B is an isometric partial cross-sectional view of an embodiment of the fan blade having a laser or electron beam weld configuration including a serpentine weld between two welds.

FIG. 5A is an isometric partial cross-sectional view of an embodiment of fan blade 110B having laser or electron beam weld configuration 160 including two welds 152B positioned at edges 144B of rib 128B. FIG. 5B is an isometric partial cross-sectional view of an embodiment of fan blade 110B having laser or electron beam weld configuration 160 including serpentine weld 162 between two welds 152B. FIGS. 5A and 5B will be discussed together. Fan blade 110B includes pockets 126B, ribs 128B, cover 130B, and laser or electron beam weld configuration 160. Each of ribs 128B has top 138B and edges 144B. Laser or electron beam weld configuration 160 includes two welds 152B and serpentine weld 162.

Fan blade 110B has the same structure as described in reference to fan blade 110 in FIGS. 2A, 2B, 2C, 3A and 3B with a different laser or electron beam weld configuration. Laser or electron beam weld configuration 160 is positioned in ribs 128B and cover 130B. Laser or electron beam weld configuration 160 includes two welds 152B. Each of welds 152B extends through cover 130B and into rib 128B. Welds 152B are positioned at edges 144B of rib 128B. A first weld 152B extends into or grabs a first edge 144B, and a second weld 152B extends into or grabs a second edge 144B. Welds 152B may extend down an entire top 138B and edges 144B of rib 128B or a portion of top 138B and edges 144B of rib 128B. Welds 152B are positioned to be 90 degrees from top 138B of rib 128B. Laser or electron beam weld configuration 160 may also include serpentine weld 162, as shown in FIG. 5B. Serpentine weld 162 is positioned between two welds 152B. Serpentine weld 162 may extend down the entire top 138B of rib 128B or may extend down only a portion of top 138B of rib 128B.

Laser or electron beam weld configuration 160 attaches ribs 128B to cover 130B. Serpentine weld 162 captures more area over a distance to provide additional attachment between cover 130B and ribs 128B between welds 152B.

Laser or electron beam weld configuration 160 provides secure attachment of cover 130B to ribs 128B that are narrower. Welds 152B laser or electron beam welded at edges 144B of ribs 128B results in no built-in cracks adjacent pockets 126B, which reduces the stress concentrations and increases the life of fan blade 110B. If ribs 128B are wider, serpentine weld 162 reduces vibration between welds 152B, preventing any built-in cracks from propagating between welds 152B.

Figure 6:
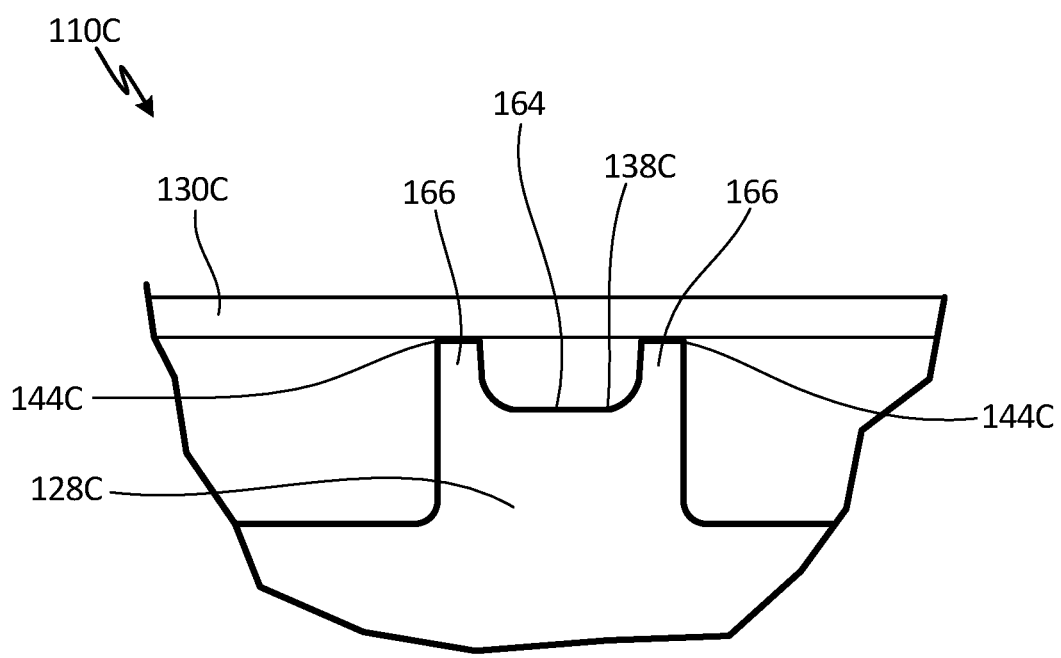
FIG. 6 is a partial cross-sectional view of an embodiment of the fan blade having a rib with a groove.

FIG. 6 shows a partial cross-sectional view of an embodiment of fan blade 110C having rib 128C with groove 164.

Fan blade 110C includes ribs 128C and cover 130C. Each of ribs 128C has top 138C, edges 144C, groove 164, and tabs 166.

Fan blade 110C has a similar structure as described in reference to fan blade 110 in FIGS. 2A, 2B, 2C, 3A and 3B. Any number of ribs 128C may have groove 164. Groove 164 is a groove or cut-out in top 138C between edges 144C of rib 128C such that groove 164 forms tabs 166 on either side of groove 164. Groove 164 extends straight into top 138C and has a rounded bottom portion such that a cross-section of groove 164 is U-shaped. Tabs 166 are protrusions that contact cover 130C at 90 degrees. Groove 164 and tabs 166 may extend down an entire top 138C of rib 128C or a portion of top 138C of rib 128C.

Tabs 166 of rib 128C are fused to cover 130C during laser or electron beam welding. Tabs 166 additionally provide support during laser or electron beam welding. Top portions of tabs 166 are completely fused to prevent any built-in cracks from forming, therefore prolonging the life of fan blade 110C. Fan blade 110C has reduced stress concentrations.

Figure 7:
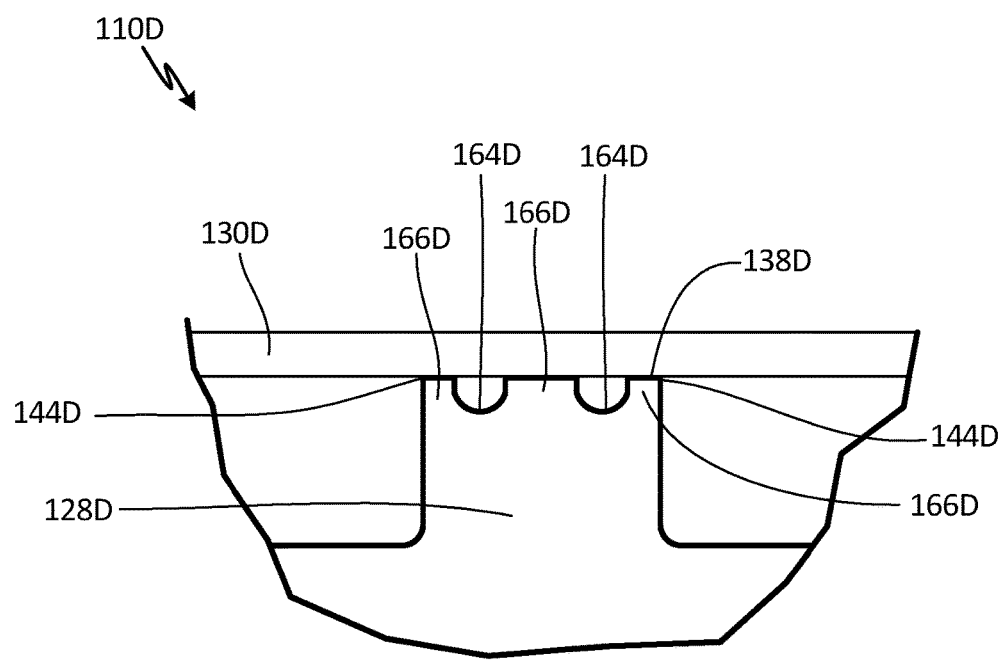
FIG. 7 is a partial cross-sectional view of an embodiment of the fan blade having a rib with a plurality of grooves between edges of the rib.

FIG. 7 shows a partial cross-sectional view of an embodiment of fan blade 110D having rib 128D with a plurality of grooves 164D between edges 144D of rib 128D. Fan blade 110D includes ribs 128D and cover 130D. Each of ribs 128D has top 138D, edges 144D, grooves 164D, and tabs 166D.

Fan blade 110D has a similar structure as described in reference to fan blade 110 in FIGS. 2A, 2B, 2C, 3A and 3B. Any number of ribs 128D may have grooves 164D. Grooves 164D are grooves or cut-outs in top 138D between edges 144D of rib 128D such that grooves 164D form three tabs 166D. A first tab 166D is adjacent a first edge 144D, a second tab 166D is adjacent a second edge 144D, and a third tab 166D is between grooves 164D. Tabs 166D are protrusions that contact cover 130D at 90 degrees. Grooves 164D and tabs 166D may extend down an entire top 138D of rib 128D or a portion of top 138D of rib 28D.

Tab 166D between grooves 164D is consumed during laser or electron beam welding. Tabs 166D adjacent edges 144D provide support to cover 130D during welding. Tab 166D between grooves 164D is consumed to prevent any built-in cracks from forming, prolonging the life of fan blade 110C. Fan blade 110D has reduced stress concentrations. Additionally, consumption of a single tab 166D between grooves 164D is quicker and requires less heat input.

Figure 8:
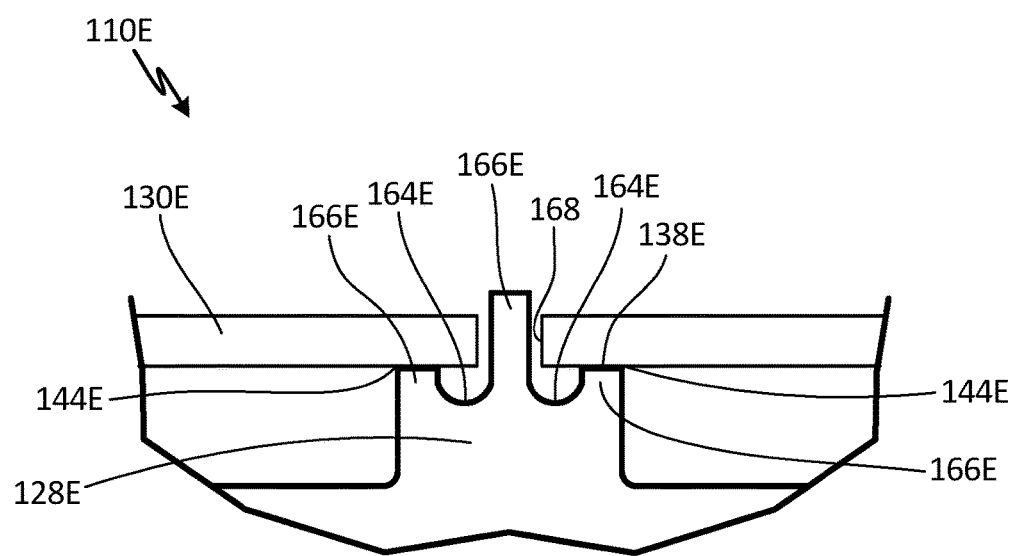
FIG. 8 is a partial cross-sectional view of an embodiment of the fan blade having a cover with a hole and a rib with a tab that extends through the hole.

FIG. 8 shows a partial cross-sectional view of an embodiment of fan blade 110E having cover 130E with hole 168 and rib 128E with tab 166E that extends through hole 168. Fan blade 110E includes rib 128E and cover 130E. Each of ribs 128E has top 138E, edges 144E, grooves 164E, and tabs 166E. Cover 130E includes hole 168.

Fan blade 110E has a similar structure as described in reference to fan blade 110 in FIGS. 2A, 2B, 2C, 3A and 3B. Any number of ribs 128E may have grooves 164E. Grooves 164E are grooves or cut-outs in top 138E between edges 144E of rib 128E such that grooves 164E form three tabs 166E. A first tab 166E is adjacent a first edge 144E, a second tab 166E is adjacent a second edge 144E, and a third tab 166E is between grooves 164E. Tabs 166E adjacent edges 144E are protrusions that contact cover 130E at 90 degrees. Tab 166E between grooves 164E is a protrusion that extends through hole 168 in cover 130E. Hole 168 in cover 130E is positioned to accept tab 166E between grooves 164E. Hole 168 may be laser-cut out of cover 130E. Cover 130E may have a plurality of holes 168. Grooves 164E, tabs 166E, and hole 168 may extend down an entire top 138E of rib 128E and cover 130E or down a portion of top 138E of rib 128E and cover 130E, respectively.

Tab 166E in hole 168 of cover 130E and a portion of cover 130E adjacent hole 168 is consumed during laser or electron beam welding. Tabs 166E adjacent edges 144E provide support during welding. Grooves 164E reduce stress concentrations.

Figure 9A:
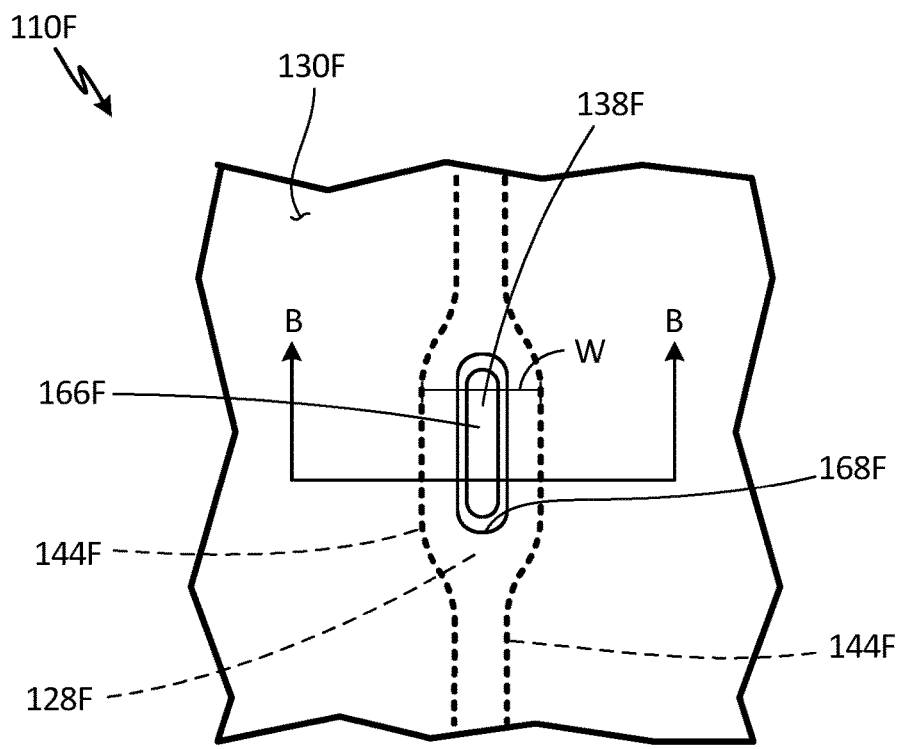
FIG. 9A is a partial top view of an embodiment of the fan blade having a cover with a rectangular-shaped hole and a rib with a section having an increased width and a tab that extends through the hole.
Figure 9B:
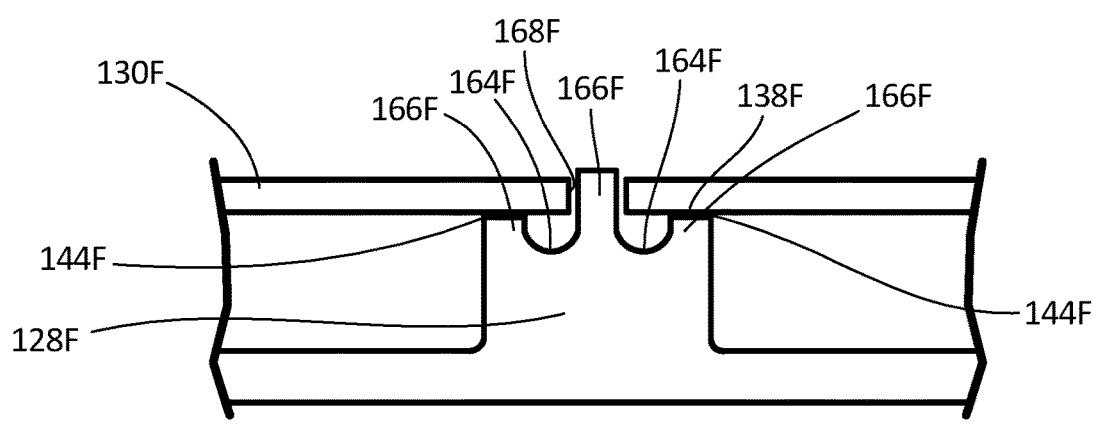
FIG. 9B is a partial cross-sectional view of the fan blade taken along line B-B of FIG. 9A.
Figure 9C:
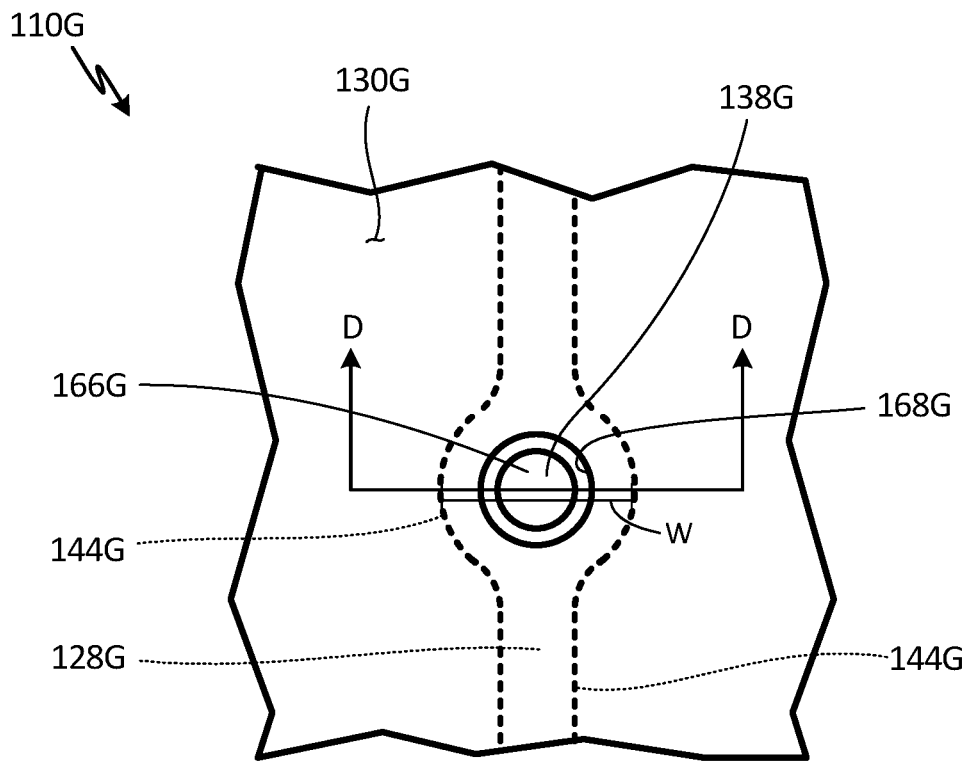
FIG. 9C is a partial top view of an embodiment of the fan blade having a cover with a circular-shaped hole and a rib with a section having an increased width and a tab that extends through the hole.
Figure 9D:
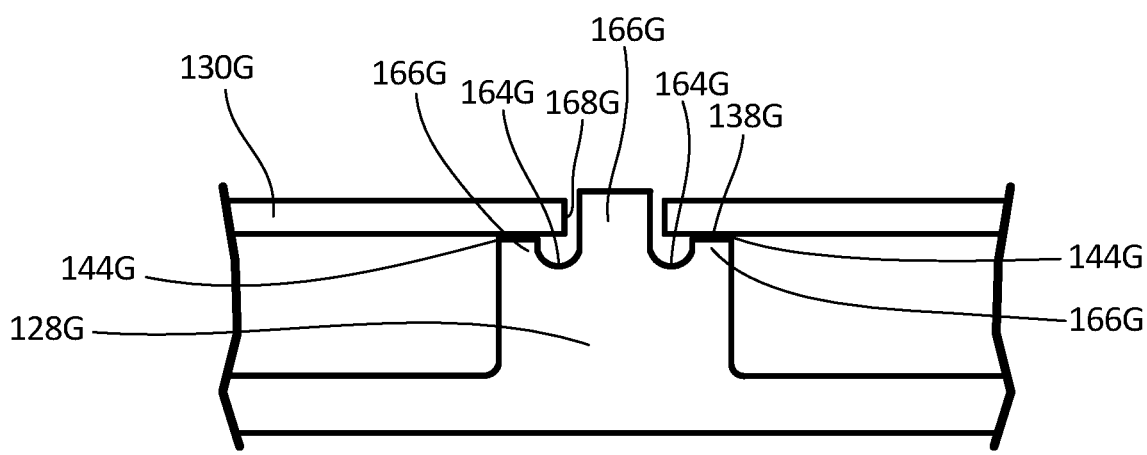
FIG. 9D is a partial cross-sectional view of the fan blade taken along line D-D of FIG. 9C.

FIG. 9A is a partial top view of an embodiment of fan blade 110F having cover 130F with rectangular-shaped hole 168F and rib 128F with a section having increased width W and tab 166F that extends through hole 168F. FIG. 9B is a partial cross-sectional view of fan blade 110F taken along line B-B of FIG. 9A. FIG. 9C is a partial top view of an embodiment of fan blade 110G having cover 130G with circular-shaped hole 168G and rib 128G with a section having increased width W and tab 166G that extends through hole 168G. FIG. 9D is a partial cross-sectional view of fan blade 110G taken along line D-D of FIG. 9C. FIGS. 9A, 9B, 9C, and 9D will be discussed together. Fan blades 110F and 110G include ribs 128F and 128G and cover 130F and 130G, respectively. Each of ribs 128F and 128G has top 138F and 138G, edges 144F and 144G, grooves 164F and 164G, and tabs 166F and 166G, respectively. Covers 130F and 130G include holes 168F and 168G, respectively.

Fan blades 110F and 110G have a similar structure as described in reference to fan blade 110 in FIGS. 2A, 2B, 2C, 3A and 3B. Any number of ribs 128F and 128G may have grooves 164F and 164G, respectively. Grooves 164F and 164G are grooves or cut-outs in tops 138F and 138G of ribs 128F and 128G between edges 144F and 144G of ribs 128F and 128G such that grooves 164F and 164G form three tabs 166F and 166G, respectively. First tabs 166F and 166G are adjacent first edges 144F and 144G, second tabs 166F and 166G are adjacent second edges 144F and 144G, and third tabs 166F and 166G are between grooves 166F and 166G, respectively. Tabs 166F and 166G adjacent edges 144F and 144G are protrusions that contact cover 130F and 130G, respectively, at 90 degrees. Tabs 166F and 166G between grooves 164F and 164G are protrusions that extend through holes 168F and 168G in covers 130F and 130G, respectively. Tab 166F between grooves 164F is rectangular-shaped while tab 166G between grooves 164G is circular-shaped. Holes 168F and 168G in covers 130F and 130G are positioned to accept tabs 166F and 166G between grooves 164F and 164G, respectively. As such, hole 168F is rectangular-shaped and hole 168G is circular-shaped. Holes 168F and 168G may be laser-cut out of covers 130F and 130G, respectively. Covers 130F and 130G may have a plurality of holes 168F and 168G, respectively. In this embodiment, grooves 164F and 164G, tabs 166F and 166G, and holes 168F and 168G extend down portions of tops 138F and 138G of ribs 128F and 128G and covers 130F and 130G, respectively. The portion of ribs 128F and 128G that include grooves 164F and 164G and tabs 166F and 166G have a width W that is larger than the width W of ribs 128F and 128G that do not include grooves 164F and 164G and tabs 166F and 166G, respectively, such that ribs 128F and 128G have portions that increase in width W. In alternate embodiments, grooves 164F and 164G, tabs 166F and 166G, and holes 168F and 168G may extend down an entirety of tops 138F and 138G of ribs 128F and 128G and covers 130F and 130G, respectively.

Tabs 166F and 166G in holes 168F and 168G of covers 130F and 130G and portions of covers 130F and 130G adjacent holes 168F and 168G, respectively, are consumed during laser or electron beam welding. Tabs 166F and 166G and portions of covers 130F and 130G adjacent holes 168F and 168G, respectively, are the only portions that undergo laser or electron beam welding. As such, the amount of welding is minimized as covers 130F and 130G are not welded to the less wide portions of ribs 138F and 138G. Welding is further minimized using circular-shaped hole 168G. Minimized welding requires less heat input, resulting in less fan blade distortion. Tabs 166F and 166G adjacent edges 144F and 144G, respectively, provide support during welding. Grooves 164F and 164G reduce stress concentrations.

Figure 10A:
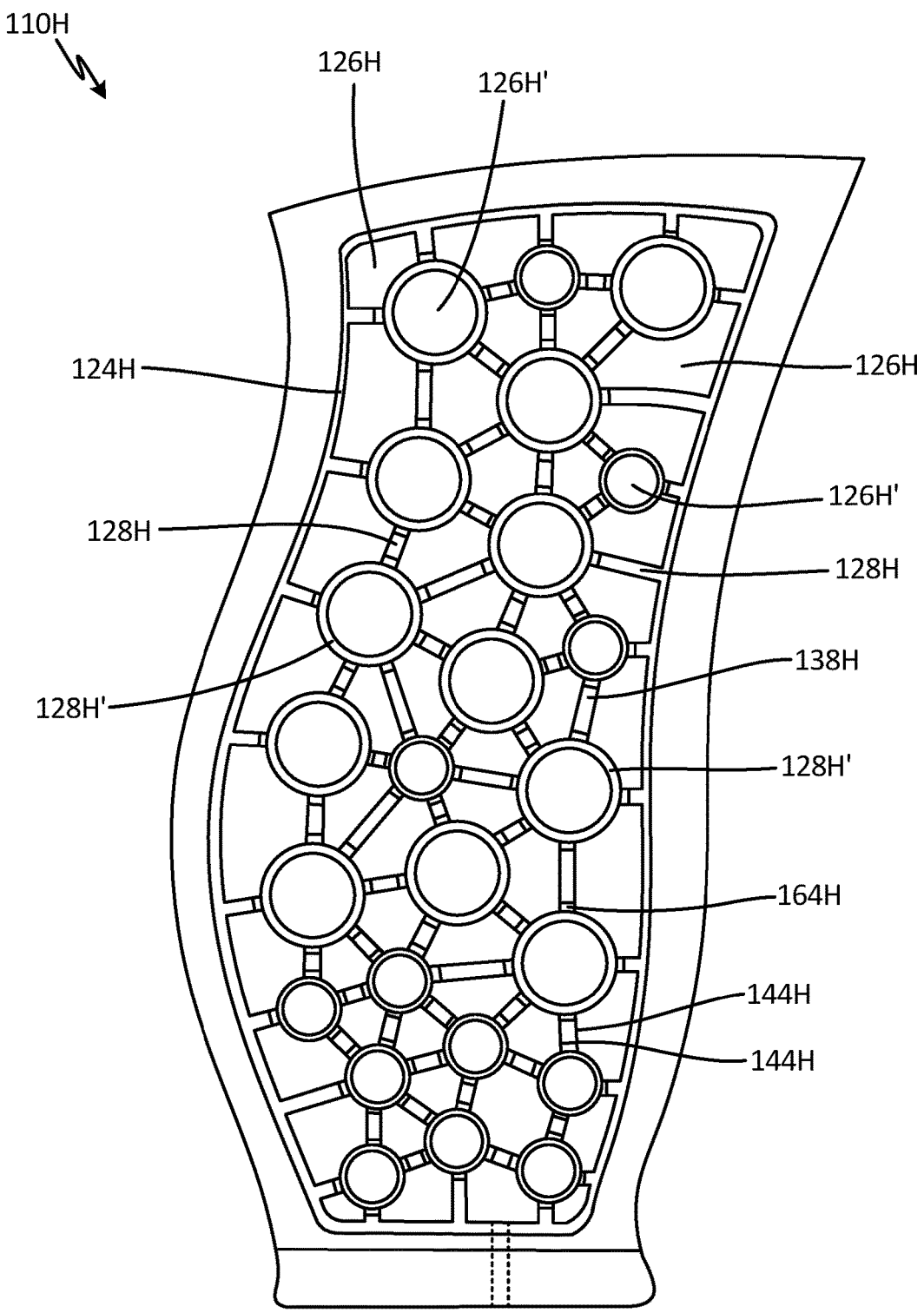
FIG. 10A is a front view of an embodiment of the fan blade with the cover removed illustrating ribs having cylindrical portions, annular pockets within the cylindrical portions, and a laser or electron beam weld configuration extending into the cylindrical portions.
Figure 10B:
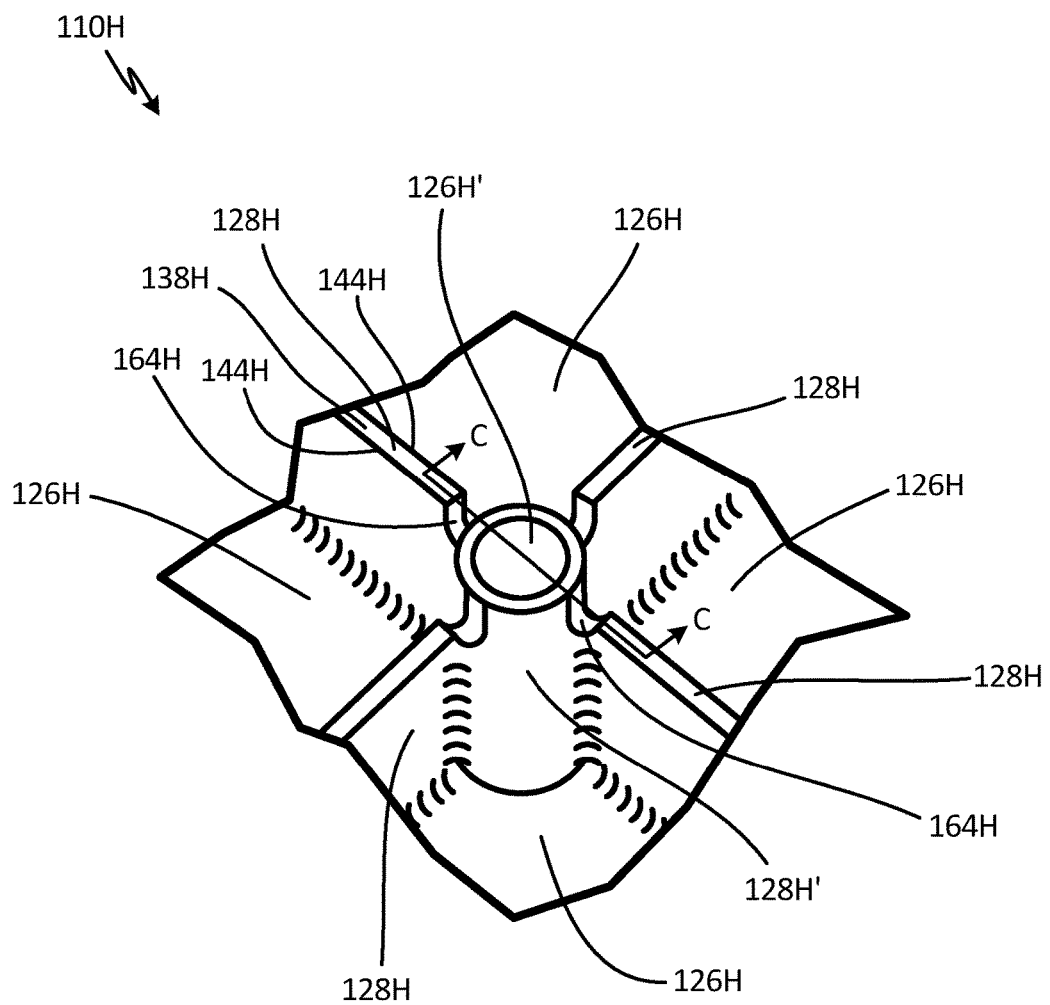
FIG. 10B is a partial isometric view of the fan blade with the cover removed.
Figure 10C:
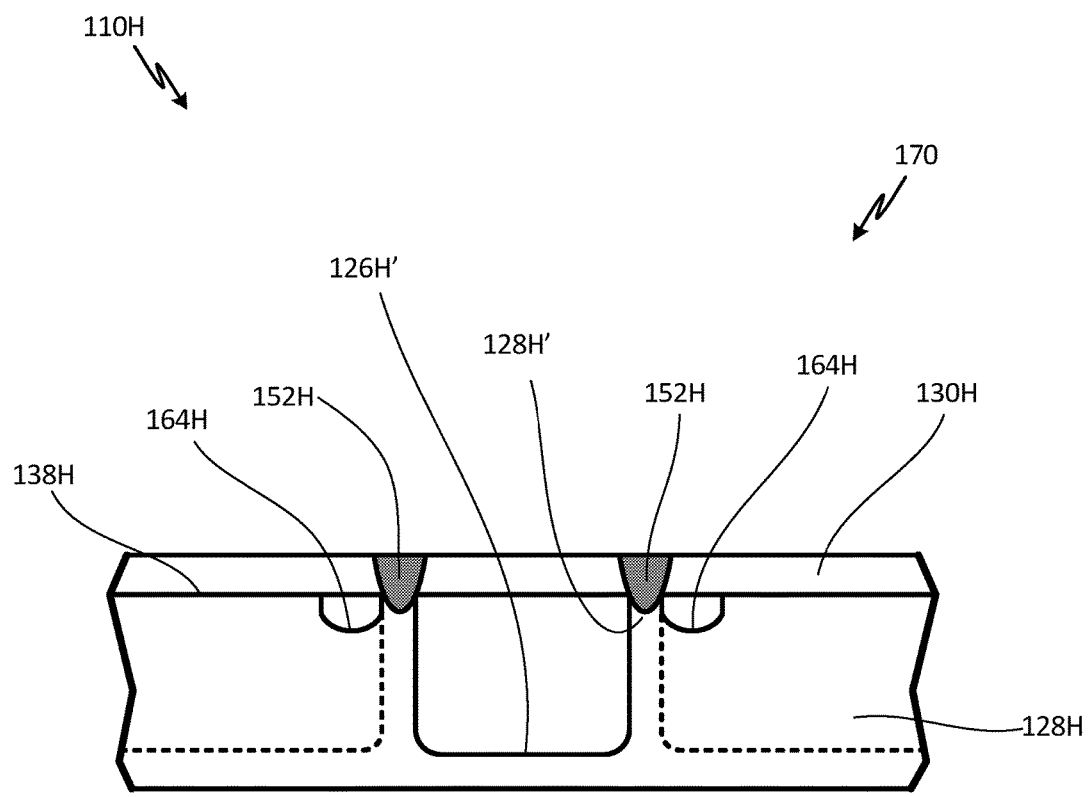
FIG. 10C is a partial cross-sectional view of the fan blade taken along line C-C of FIG. 10B with the cover welded to the cylindrical portions of the ribs.
Figure 10D:
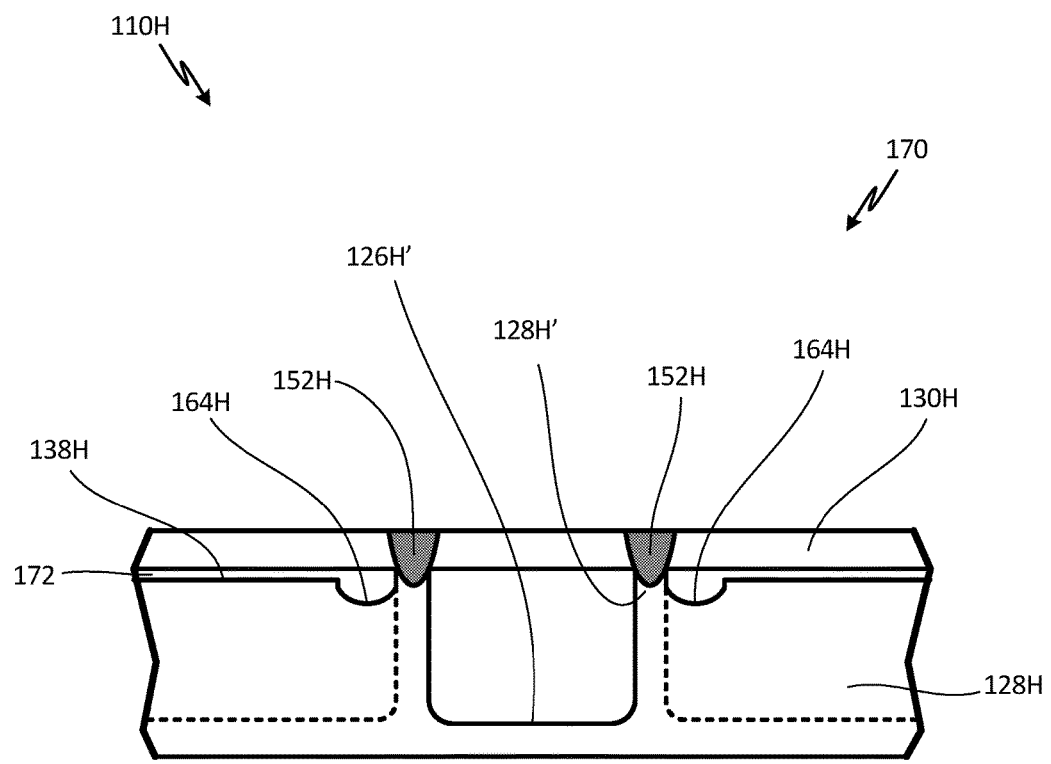
FIG. 10D is a partial cross-sectional view of an embodiment of the fan blade with the cover welded to the cylindrical portions of ribs illustrating a space between the portions of ribs that do not include cylindrical portions 128H' and the cover.

FIG. 10A is a front view of an embodiment of fan blade 110H with the cover 130H removed illustrating ribs 128H having cylindrical portions 128H', annular pockets 126H' within the cylindrical portions 128H', and laser or electron beam weld configuration 170 extending into cylindrical portions 128H'. FIG. 10B is a partial isometric view of fan blade 110H with cover 130H removed. FIG. 10C is a partial cross-sectional view of fan blade 110H taken along line C-C of FIG. 10B with cover 130H welded to cylindrical portions 128H' of ribs 128H. FIG. 10D is a partial cross-sectional view of an embodiment of fan blade 110H with cover 130H welded to cylindrical portions 128H' of ribs 128H illustrating space 172 between portions of ribs 128H that do not include cylindrical portions 128H' and cover 130H. FIGS. 10A, 10B, 10C, and 10D will be discussed together. Fan blade 110H includes recessed portion 124H, pockets 126H (shown in FIGS. 10A and 10B), pockets 126H', ribs 128H, cover 130H (shown in FIG. 10C), laser or electron beam weld configuration 170 (shown in FIG. 10C), and space 172 (shown in FIG. 10D). Ribs 128H include cylindrical portions 128H', tops 138H, edges 144H (shown in FIGS. 10A and 10B), and grooves 164H. Laser or electron beam weld configuration 170 includes weld 152H (shown in FIG. 10C).

Fan blade 110H has a similar structure as described in reference to fan blade 110 in FIGS. 2A, 2B, 2C, 3A, and 3B with a different laser or electron beam weld configuration requiring pockets 126H to include annular pockets 126H' and ribs 128H to include cylindrical portions 128H'. Annular pockets 126H' are annular cavities located within cylindrical portions 128H' of ribs 128H. Pockets 126H extend closer to a perimeter of recessed portion 124H such that the periphery of recessed portion 124H is narrower. Ribs 128H are also narrower. Any number of ribs 128H may include cylindrical portions 128H'. Cylindrical portions 128H' are portions of ribs 128H that have a cylindrical shape. Diameters of cylindrical portions 128H' may vary throughout fan blade 110H. Alternatively, diameters of cylindrical portions 128H' may all be the same throughout fan blade 110H. Diameters of cylindrical portions 128H' may vary throughout ribs 128H based on the structural needs of fan blade 110H. The height of ribs 128H may vary. For example, portions of ribs 128H that do not include cylindrical portions 128H' and that do not make up the periphery of recessed portion 124H may be machined down to a third depth, the third depth being deeper than the first depth of the periphery of recessed portion 124H but not as deep as the second depth of pockets 126H, as shown in FIG. 10D. As a result, space 172 is formed between cover 130H and portions of ribs 128H that do not include cylindrical portions 128H' or the periphery of recessed portion 124H such that cover 130H does not contact portions of ribs 128H that do not include cylindrical portions 128H' or the periphery of recessed portion 124H. Alternatively, portions of ribs 128H that do not include cylindrical portions 128H' and that do not make up the periphery of recessed portion 124H may be machined down to the second depth of pockets 126H. Grooves 164H are grooves or cut-outs in top 138H of rib 128H adjacent cylindrical portions 128H'.

Grooves 164H are located in all portions of ribs 128H that are adjacent cylindrical portions 128H'. Grooves 164H extend down a portion of top 138H of rib 128H such that grooves 164H extend from a first edge 144H to a second edge 144H. As such, pockets 126H are fluidly connected through grooves 164H when cover 130H is in place. Laser or electron beam weld configuration 170 is positioned in cylindrical portions 128H' of ribs 128H and cover 130H, as shown in FIG. 10C. Cover 130H may be coated with a cathodic arc coating in locations where cover 130H contacts tops 138H of ribs 128H. Laser or electron beam weld configuration 170 includes welds 152H. Welds 152H extend through cover 130H and into tops 138H of cylindrical portions 128H' of ribs 128H. Welds 152H extend around tops 138H of cylindrical portions 128H' of ribs 128H. Welds 152H may be full-penetration circular butt welds. In this embodiment, welds 152H do not extend into portions of ribs 128H that are not cylindrical portions 128H'. In alternate embodiments, welds 152H may also extend into some or all portions of ribs 128H that are not cylindrical portions 128H'. Welds 152H are positioned to be 90 degrees from tops 138H of ribs 128H.

Grooves 164H allow for fluid communication among pockets 126H. As such, all pockets 126H of fan blade 110H can be pressurized to the same degree by introducing inert gas into a single pocket 126H. For example, to carry out an argon gas pressurization operation, gas can be introduced into a single pocket 126H through a hole or passageway that extends from the root of the blade into the pocket, and the gas will flow into and pressurize all pockets 126H of fan blade 110H. Laser or electron beam weld configuration 170 uses welds 152H in cylindrical portions 128H' of ribs 128H to attach ribs 128A to cover 130A. Laser or electron beam weld configuration 170 provides secure attachment of cover 130H to ribs 128H that are narrower. Because ribs 128H can be so narrow, more metal can be removed from fan blade 110, reducing the weight of fan blade 110. Additionally, in embodiments where portions of ribs 128H that do not include cylindrical portions 128H' or the periphery of recessed portion 124H are machined to a third depth, even more metal is removed from fan blade 110, further reducing the weight of fan blade 110, and the stress concentrations are reduced. Varied diameters of cylindrical portions 128H' can tune fan blade 110H, or optimize management of vibratory stresses of fan blade 110H during operation. Further, laser or electron beam weld configuration 170 requires less overall welding and results in less weld shrinkage. Laser or electron beam weld configuration 170 in circular portions 128H' of ribs 128H reduces distortion. Laser or electron beam weld configuration 170 is also easier to program. Additionally, grooves 164H eliminate built-in cracks, reducing the stress concentrations.

Laser or electron beam weld configurations 134, 134', 136, 156, 160, and 170 may vary within fan blade 110. Additionally, placement of brazing material 158, one or more grooves 164 and one or more tabs 166 extending through one or more holes 168 in cover 130 may also vary within fan blade 110. Further, laser welding or electron beam welding may be used to achieve the weld configurations and yield the desired results.

High energy beam welding, such as laser welding or electron beam welding, provides welds for cover attachment while reducing distortion and increasing structural integrity and fatigue life of the fan blade. High energy beam welding is quicker and simpler, allowing for increased production capability and consistency while reducing environmental production constraints.

DISCUSSION OF POSSIBLE EMBODIMENTS

The following are non-exclusive descriptions of possible embodiments of the present invention.

An airfoil includes an airfoil body; a recessed portion of a first depth in a first side of the airfoil body, the recessed portion including: a plurality of pockets of a second depth located within the recessed portion; and ribs of the first depth located between the pockets; a cover configured to fit into the recessed portion such that an interior surface of the cover engages the ribs and an exterior surface of the cover is about flush with an exterior surface of the first side of the airfoil body; and a high energy beam weld configuration extending through the cover and into the ribs and positioned to attach the cover to the ribs.

The airfoil of the preceding paragraph can optionally include, additionally and/or alternatively, any one or more of the following features, configurations and/or additional components:

The airfoil body is a twisted airfoil body.

A braze material is positioned on an interior surface of the cover or a rib.

The high energy beam weld configuration includes a single weld extending down a center of a rib.

The high energy beam weld configuration includes two welds spaced along a top and between edges of a rib.

The high energy beam weld configuration includes two welds positioned at edges of a rib.

The high energy beam weld configuration includes a serpentine weld positioned between two welds.

A rib includes a groove between edges of the rib.

The rib includes tabs on either side of the groove, the tabs being configured to be consumed by welds such that the groove is in contact with the cover after high energy beam welding the cover to the rib.

A rib includes a plurality of grooves between edges of the rib.

The rib includes tabs on either side of the grooves.

The cover includes a hole and a rib includes a tab that extends through the hole.

The cover includes a rectangular-shaped hole and a rib includes a section having an increased width, the section also having a tab that extends through the rectangular-shaped hole in the cover.

The cover includes a circular-shaped hole and a rib includes a section having an increased width, the section also having a tab that extends through the circular-shaped hole in the cover.

The high energy beam weld configuration varies along the ribs.

The recessed portion includes a cavity adjacent the exterior surface of the airfoil body.

The weld between the cover and the exterior surface of the airfoil body extends to the cavity adjacent the exterior surface of the airfoil body.

The high energy beam weld configuration is selected from a group consisting of: a laser weld configuration and an electron beam weld configuration.

The plurality of pockets includes an annular pocket within a cylindrical portion of a rib and wherein the high energy beam weld configuration extends through the cover and into the cylindrical portion of the rib.

A method of manufacturing an airfoil includes machining a recessed portion of a first depth into a first side of a titanium airfoil body; milling pockets of a second depth into the recessed portion in the first side of the titanium forging of the airfoil body; placing a cover into the recessed portion of the airfoil body such that the exterior surface of the cover is about flush with a first surface of the first side of the airfoil body; and high energy beam welding through the cover and into ribs between the pockets in the airfoil body such that the cover attaches and seals to the airfoil body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:
   an airfoil body having a twist from a root of the airfoil to a tip of the airfoil;
   a recessed portion of a first depth in a first side of the airfoil body, the recessed portion including:
      a plurality of pockets of a second depth located within the recessed portion; and
      ribs of the first depth located between the pockets;
   a cover configured to fit into the recessed portion such that an interior surface of the cover engages the ribs and an exterior surface of the cover is about flush with an exterior surface of the first side of the airfoil body; and
   a high energy beam weld configuration extending through the cover and into the ribs and positioned to attach the cover to the ribs.

2. The airfoil of claim 1 wherein a braze material is positioned on an interior surface of the cover or a rib.

3. The airfoil of claim 1 wherein the high energy beam weld configuration includes a single weld extending down a center of a rib.

4. The airfoil of claim 1 wherein the high energy beam weld configuration includes two welds spaced along a top and between edges of a rib.

5. An airfoil comprising:
   an airfoil body;
   a recessed portion of a first depth in a first side of the airfoil body, the recessed portion including:
      a plurality of pockets of a second depth located within the recessed portion; and
      ribs of the first depth located between the pockets;
   a cover configured to fit into the recessed portion such that an interior surface of the cover engages the ribs and an exterior surface of the cover is about flush with an exterior surface of the first side of the airfoil body; and
   a high energy beam weld configuration extending through the cover and into the ribs and positioned to attach the cover to the ribs wherein the high energy beam weld configuration includes two welds positioned at edges of a rib.

6. The airfoil of claim 1 wherein the high energy beam weld configuration includes a serpentine weld positioned between two welds.

7. The airfoil of claim 1 wherein a rib includes a groove between edges of the rib.

8. The airfoil of claim 7 wherein the rib includes tabs on either side of the groove, the tabs being configured to be consumed by welds such that the groove is in contact with the cover after high energy beam welding the cover to the rib.

9. The airfoil of claim 1 wherein a rib includes a plurality of grooves between edges of the rib.

10. The airfoil of claim 9 wherein the rib includes tabs on either side of the grooves.

11. The airfoil of claim 1 wherein the cover includes a hole and a rib includes a tab that extends through the hole.

12. The airfoil of claim 1 wherein the cover includes a rectangular-shaped hole and a rib includes a section having an increased width, the section also having a tab that extends through the rectangular-shaped hole in the cover.

13. The airfoil of claim 1 wherein the cover includes a circular-shaped hole and a rib includes a section having an increased width, the section also having a tab that extends through the circular-shaped hole in the cover.

14. The airfoil of claim 1 wherein the high energy beam weld configuration varies along the ribs.

15. The airfoil of claim 1 wherein the recessed portion includes a cavity adjacent the exterior surface of the airfoil body.

16. The airfoil of claim 15 wherein the weld between the cover and the exterior surface of the airfoil body extends to the cavity adjacent the exterior surface of the airfoil body.

17. The airfoil of claim 15 wherein the high energy beam weld configuration is selected from a group consisting of: a laser weld configuration and an electron beam weld configuration.

18. The airfoil of claim 1 wherein the plurality of pockets includes an annular pocket within a cylindrical portion of a rib and wherein the high energy beam weld configuration extends through the cover and into the cylindrical portion of the rib.

19. A method of manufacturing an airfoil comprising:
    machining a recessed portion of a first depth into a first side of a titanium airfoil body having a twist from a root of the airfoil to a tip of the airfoil;
    milling pockets of a second depth into the recessed portion in the first side of the titanium forging of the airfoil body;
    placing a cover into the recessed portion of the airfoil body such that the exterior surface of the cover is about flush with a first surface of the first side of the airfoil body; and
    high energy beam welding through the cover and into ribs between the pockets in the airfoil body such that the cover attaches and seals to the airfoil body.

20. An airfoil comprising:
    an airfoil body;
    a recessed portion of a first depth in a first side of the airfoil body, the recessed portion including:
        a plurality of pockets of a second depth located within the recessed portion;
        ribs of the first depth located between the pockets; and
    a cover configured to fit into the recessed portion such that an interior surface of the cover engages the ribs and an exterior surface of the cover is about flush with the exterior surface of the first side of the airfoil body;
    a first high energy beam weld configuration extending through the cover and into the ribs and positioned to attach the cover to the ribs; and
    a second high energy beam weld configuration extending into the cover and a portion of the airfoil body adjacent the cover, wherein the second high energy beam weld configuration extends into a cavity in the recessed portion that extends around a periphery of the recessed portion.

21. An airfoil comprising:
    an airfoil body;
    a recessed portion of a first depth in a first side of the airfoil body, the recessed portion including:
        a plurality of pockets of a second depth located within the recessed portion;
        ribs of the first depth located between the pockets; and
        ribs of a third depth connected to the ribs of the first depth, the third depth being deeper than the first depth but not as deep as the second depth;
    a cover configured to fit into the recessed portion such that an interior surface of the cover engages the ribs and an exterior surface of the cover is about flush with an exterior surface of the first side of the airfoil body; and
    a high energy beam weld configuration extending through the cover and into the ribs and positioned to attach the cover to the ribs.

* * * * *